US011218079B2

(12) United States Patent
Tsuruta et al.

(10) Patent No.: US 11,218,079 B2
(45) Date of Patent: Jan. 4, 2022

(54) POWER CONVERSION DEVICE

(71) Applicant: TOSHIBA MITSUBISHI-ELECTRIC INDUSTRIAL SYSTEMS CORPORATION, Chuo-ku (JP)

(72) Inventors: Ryoji Tsuruta, Chiyoda-ku (JP); Hiromitsu Suzuki, Chuo-ku (JP); Toshiaki Oka, Chuo-ku (JP); Ritaka Nakamura, Chuo-ku (JP); Masashi Nakamura, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 16/971,196

(22) PCT Filed: Mar. 9, 2018

(86) PCT No.: PCT/JP2018/009174
§ 371 (c)(1),
(2) Date: Aug. 19, 2020

(87) PCT Pub. No.: WO2019/171568
PCT Pub. Date: Sep. 12, 2019

(65) Prior Publication Data
US 2021/0119550 A1    Apr. 22, 2021

(51) Int. Cl.
*H02M 7/217* (2006.01)
*H02M 5/458* (2006.01)
(Continued)

(52) U.S. Cl.
CPC ....... *H02M 5/4585* (2013.01); *H02M 7/2173* (2013.01); *H02M 7/25* (2013.01);
(Continued)

(58) Field of Classification Search
CPC .... H02M 5/4585; H02M 7/2173; H02M 7/25; H02M 7/483; H02M 7/797; H02M 7/4835
See application file for complete search history.

(56) References Cited

U.S. PATENT DOCUMENTS 9,343,994 B2 * 5/2016 Hosokawa ............. H02M 7/49
2010/0328970 A1  12/2010 Capogna
(Continued)

FOREIGN PATENT DOCUMENTS

JP    7-46846 A    2/1995
JP    7-46847 A    2/1995
(Continued)

OTHER PUBLICATIONS

International Preliminary Report on Patentability and Written Opinion dated Sep. 24, 2020 in PCT/JP2018/009174 (with English Translation), 16 pages.
(Continued)

*Primary Examiner* — Gary L Laxton
(74) *Attorney, Agent, or Firm* — Oblon, McClelland, Maier & Neustadt, L.L.P.

(57) ABSTRACT

A power conversion device includes a transformer, a plurality of converter cells, and a control circuit that controls semiconductor switching elements in each of the converter cells to be turned on and off. The transformer includes: a primary winding group being connected in multiple phases to an AC power supply including multiple phases; and a plurality of secondary winding groups. Each secondary winding group includes, in each of the multiple phases, secondary windings each formed of a single-phase open winding. Each converter cell converts a single-phase AC voltage between AC nodes connected to the respective secondary windings into a DC voltage by control of the semiconductor switching elements to be turned on and off,
(Continued)

and outputs the converted DC voltage between a pair of DC nodes. The DC nodes of the plurality of converter cells are connected in series between a first DC terminal and a second DC terminal.

11 Claims, 14 Drawing Sheets

(51) Int. Cl.
*H02M 7/25* (2006.01)
*H02M 7/483* (2007.01)
*H02M 7/797* (2006.01)

(52) U.S. Cl.
CPC ........... *H02M 7/483* (2013.01); *H02M 7/797* (2013.01); *H02M 7/4835* (2021.05)

(56) References Cited

U.S. PATENT DOCUMENTS

| | | | |
|---|---|---|---|
| 2015/0008859 A1 | 1/2015 | Inoue et al. | |
| 2018/0097450 A1* | 4/2018 | Andersson | H02M 7/7575 |
| 2019/0372478 A1* | 12/2019 | Trainer | H02M 7/043 |

FOREIGN PATENT DOCUMENTS

| | | |
|---|---|---|
| JP | 4490591 B2 | 6/2010 |
| JP | 2014-100064 A | 5/2014 |
| JP | 2015-12769 A | 1/2015 |
| WO | WO 2013/108376 A1 | 7/2013 |

OTHER PUBLICATIONS

International Search Report dated Apr. 17, 2018 in PCT/JP2018/009174 filed Mar. 9, 2018, citing documents AA-AB and AS-AT therein, 2 pages.

Kolar, et al. "A New Switching Loss Reduced Discontinuous PWM Scheme for a Unidirectional Three-Phase/Switch/Level Boost-Type PWM (Vienna) Rectifier"; published in Collected Papers in the 21st INTELEC, Jun. 6-9, 1999, 10 total pages.

Okazaki, et al., "Experimental Comparisons Between Modular Multilevel DSCC Inverters and TSBC Converters for Medium-Voltage Motor Drives", IEEE Transactions on Power Electronics, vol. 32, No. 3, Mar. 2017, pp. 1805-1817.

* cited by examiner

POWER CONVERSION DEVICE

TECHNICAL FIELD

The present disclosure relates to a power conversion device, and more particularly to a power conversion device that converts alternating-current (AC) power into direct-current (DC) power.

BACKGROUND ART

As a power conversion device that converts multi-phase AC power into DC power, Japanese Patent Laying-Open No. 2014-100064 (PTL 1) discloses a configuration formed of a combination of a multiple phase-shift transformer and a plurality of diode rectifiers as separately-excited power converters.

CITATION LIST

Patent Literature

PTL 1: Japanese Patent Laying-Open No. 2014-100064

Non Patent Literature

NPL 1: "A New Switching Loss Reduced Discontinuous PWM Scheme for a Unidirectional Three-Phase/Switch/Level Boost-Type PWM (VIENNA) Rectifier"; by Johann W KOLAR and Uwe DROFENIK; published in Collected Papers in the 21st INTELEC (Jun. 6 to 9, 1999).

SUMMARY OF INVENTION

Technical Problem

According to PTL 1, AC power is converted into DC power by the configuration formed of a combination of a multiple phase-shift transformer and diode rectifiers. Thus, in order to suppress the harmonic of the AC current, the number of pulses in the diode rectifier needs to be increased. Accordingly, for suppression of the harmonic, the number of secondary windings in the multiple phase-shift transformer increases, thereby increasing the size of the power conversion device and decreasing the reliability by complicating the transformer winding structure.

The diode rectifier used in PTL 1 is a separately-excited converter. Thus, fluctuations in the input AC voltage directly influences the DC voltage to be output, with the result that the fluctuations in DC voltage may increase. Furthermore, in the event of a system fault, overcurrent suppression by controlling a current path becomes difficult, which leads to a concern that the operation continuity performance may decrease.

On the other hand, when AC power is converted into DC power by a self-excited converter formed using a semiconductor switching element, the fluctuations in DC voltage and the operation continuity performance at occurrence of a system fault are improved. In the application in which a high DC voltage is output, however, the withstand voltage required for the semiconductor switching element may rise. In general, a trade-off relation exists between a higher frequency and a higher withstand voltage in the semiconductor switching element. Thus, when a semiconductor switching element with a high withstand voltage is used at a low frequency, the frequency of the harmonic of the AC current also relatively decreases. This consequently leads to a concern that a passive filter for suppressing the harmonic of the AC current may be increased in size.

The present disclosure has been made in order to solve the above-described problems. An object of the present disclosure is to reduce the size of an insulation-type power conversion device, which converts AC power into DC power and has a transformer applied thereto, in a configuration including a self-excited converter for improving the operation continuity performance.

Solution to Problem

According to an aspect of the present disclosure, a power conversion device performs power conversion between: a plurality of AC terminals connected to an AC power supply having multiple phases; and a first DC terminal and a second DC terminal. The power conversion device includes a transformer, a plurality of converter cells, and a control circuit. The transformer includes a plurality of primary windings connected in multiple phases to the plurality of AC terminals, and a plurality of secondary windings each formed of a single-phase open winding. The secondary windings are disposed to form a plurality of secondary winding groups each having secondary windings corresponding to the respective multiple phases. The converter cells are disposed to correspond to the respective secondary windings. Each of the converter cells converts a single-phase AC voltage between a pair of AC nodes each connected to a corresponding one of the secondary windings into a DC voltage by control of a plurality of semiconductor switching elements to be turned on and off, and outputs the DC voltage between a pair of DC nodes. The DC nodes of the converter cells are connected in series between the first DC terminal and the second DC terminal. The control circuit controls each of the semiconductor switching elements to be turned on and off so as to control an AC current on each of the AC nodes and the DC voltage between the DC nodes in each of the converter cells.

Advantageous Effects of Invention

According to the power conversion device of the present disclosure, an insulation-type power conversion device that converts AC power into DC power and that has a transformer applied thereto can be reduced in size by applying a transformer including secondary windings each formed of a single-phase open winding to the configuration including a self-excited converter for improving the operation performance. Furthermore, by the configuration in which a plurality of secondary windings each formed of a single-phase open winding are provided in each phase, the withstand voltage required for a semiconductor switching element in each converter cell can be lowered. This facilitates adoption of a high-speed semiconductor switching element, and thereby, the frequency of the current ripple from an AC power supply can be raised. Accordingly, a passive filter for removing this current ripple can be reduced in size. As a result, the power conversion device is reduced in size.

DESCRIPTION OF EMBODIMENTS

Figure 1:
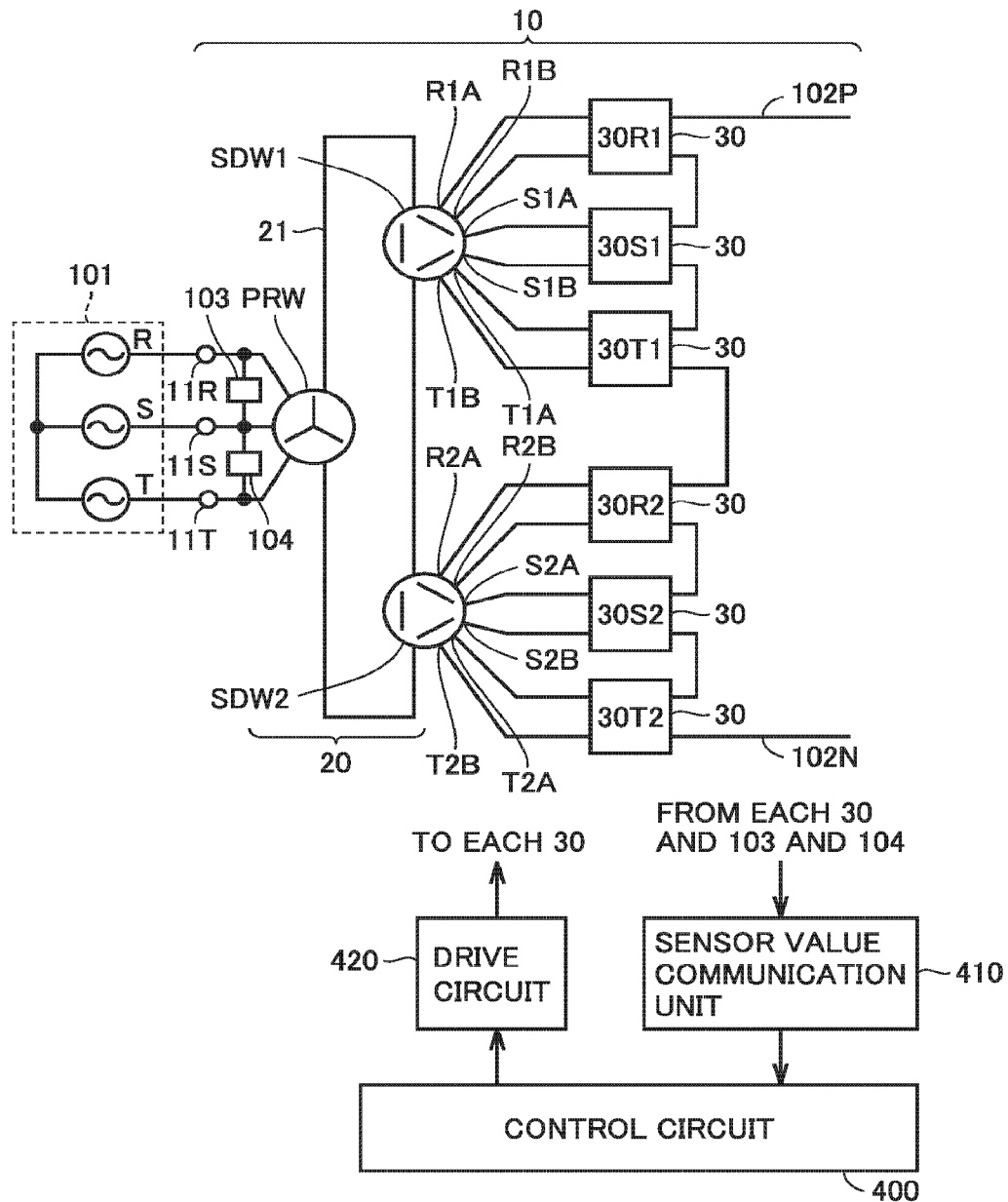
FIG. 1 is a circuit diagram showing a main circuit configuration of a power conversion device in the first embodiment of the present disclosure.

The embodiments of the present disclosure will be hereinafter described in detail with reference to the accompanying drawings. In the following description, the same or corresponding components in the accompanying drawings will be designated by the same reference characters, and description thereof will not be basically repeated.

First Embodiment (Circuit Configuration)

FIG. 1 is a circuit diagram showing a main circuit configuration of a power conversion device in the first embodiment of the present disclosure.

Referring to FIG. 1, a power conversion device 10 according to the first embodiment includes AC terminals 11R, 11S, 11T, voltage sensors 103 and 104, a transformer 20, a plurality of converter cells 30, and DC terminals 102P, 102N. AC terminals 11R, 11S, and 11T are electrically connected to an R-phase, an S-phase and a T-phase, respectively, of a three-phase AC power supply 101. Voltage sensors 103 and 104 detect line voltages vacRS and vacST on the primary winding.

Power conversion device 10 converts three-phase AC power from three-phase AC power supply 101 into DC power, and outputs the converted DC power between DC terminals 102P and 102N. Transformer 20 includes a primary winding group PRW and k (k: a natural number equal to or greater than 2) secondary winding groups SDW. In the configuration example in FIG. 1, two secondary winding groups SDW1 and SDW2 are disposed. AC terminals 11R, 11S, and 11T correspond to a "plurality of AC terminals". DC terminals 102P (on the high potential side) and 102N (on the low potential side) correspond to "the first DC terminal and the second DC terminal", respectively.

Figure 2:
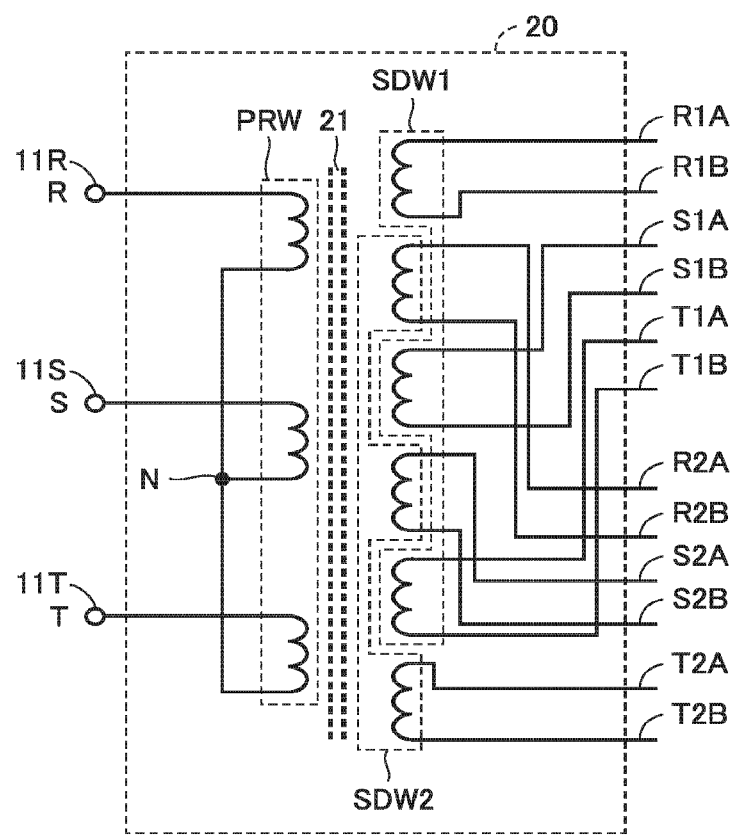
FIG. 2 is a circuit diagram showing a winding configuration of a transformer shown in FIG. 1.

FIG. 2 is a circuit diagram showing a winding configuration of transformer 20. Referring to FIG. 2, primary winding group PRW includes a plurality of primary windings that are three-phase star-connected through a neutral point N. The primary windings of the respective phases are wound around a core 21, and connected through respective AC terminals 11R, 11S and 11T shown in FIG. 1 to the respective R-phase, S-phase and T-phase of three-phase AC power supply 101. As known well, from the R-phase, the S-phase and the T-phase of three-phase AC power supply 101, AC power supply voltages are supplied that have the same frequency and that are shifted in phase by 120°.

Each of secondary winding groups SDW1 and SDW2 includes secondary windings of three phases that are wound around core 21. Each of the secondary windings is formed of a single-phase open winding. Thus, secondary winding group SDW1 is provided with: terminals R1A and R1B of the secondary winding in the R-phase; terminals S1A and S1B of the secondary winding in the S-phase; and terminals T1A and T1B of the secondary winding in the T-phase. Similarly, secondary winding group SDW2 is provided with: terminals R2A and R2B of the secondary winding in the R-phase; terminals S2A and S2B of the secondary winding in the S-phase; and terminals T2A and T2B of the secondary winding in the T-phase.

Each of the secondary windings is magnetically coupled through core 21 to the primary winding in the same phase. As a result, each of the secondary windings receives an output of single-phase AC power having the same phase and the same frequency as those in the R-phase, the S-phase or the T-phase of three-phase AC power supply 101. The AC voltage amplitude of each secondary winding is proportional to the amplitude of the voltage in each phase of three-phase AC power supply 101 in accordance with the turns ratio between the primary winding and the secondary winding.

Again referring to FIG. 1, the plurality of converter cells 30 are disposed to correspond to the respective secondary windings in transformer 20, and each convert the single-phase AC power in each of the secondary windings into DC power. As will be described below, the first embodiment applies the circuit configuration in which converter cell 30 is not subjected to power regeneration.

Converter cell 30 is disposed for each secondary winding, i.e., for each combination of the phases (R, S, T) and the secondary winding groups (k). Thus, the configuration example in FIG. 1 includes six converter cells 30 (3×2=6). So as to correspond to the secondary windings (the R-phase, the S-phase, and the T-phase) of secondary winding group SDW1, a converter cell 30R1 connected to terminals R1A and R1B is disposed in the R-phase; a converter cell 30S1 connected to terminals S1A and S1B is disposed in the S-phase; and a converter cell 30T1 connected to terminals T1A and T1B is disposed in the T-phase.

Similarly, so as to correspond to the secondary windings (the R-phase, the S-phase, and the T-phase) of secondary winding group SDW2, a converter cell 30R2 connected to terminals R2A and R2B is disposed in the R-phase; a converter cell 30S2 connected to terminals S2A and S2B is disposed in the S-phase; and a converter cell 30T2 connected to terminals T2A and T2B is disposed in the T-phase.

In the following description, converter cells 30 disposed in each phase (R, S, T) and in each secondary winding group (k) are collectively denoted as a converter cell 30Xn assuming that converter cell 30 is disposed in the X-phase (X=R, S, or T) and in the n-th (n: a natural number of 1≤n≤k) secondary winding group.

Figure 3:
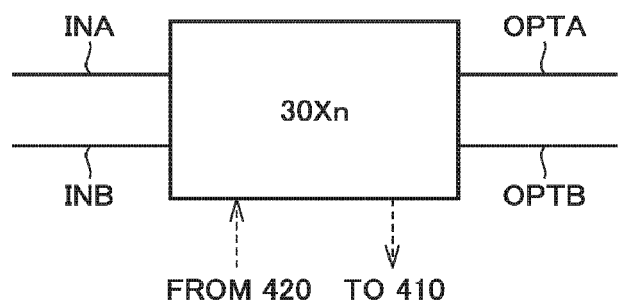
FIG. 3 is a block diagram illustrating an input to and/an output from each converter cell shown in FIG. 1.

FIG. 3 shows a block diagram illustrating an input to and an output from each converter cell 30Xn.

Referring to FIG. 3, each converter cell 30Xn includes a pair of AC nodes INA and INB, and a pair of DC nodes OPTA and OPTB.

AC nodes INA and INB are connected to the respective secondary windings (single-phase open windings), and each receive an input of a single-phase AC voltage. The DC voltage obtained by converting the single-phase AC voltage is output between DC nodes OPTA and OPTB. As will be described below, converter cell 30 is formed of a self-excited converter that converts a single-phase AC voltage into a DC voltage as each semiconductor switching element is controlled to be turned on and off.

In order to connect converter cells 30R1, 30S1, 30T1, 30R2, 30S2, and 30T2 in series between DC terminals 102P and 102N as shown in FIG. 1, DC node OPTA of converter cell 30 is connected to DC terminal 102P or DC node OPTB of converter cell 30 on the high potential side. Also, DC node OPTB of converter cell 30 is connected to DC node OPTA of converter cell 30 on the low potential side or DC terminal 102N. As a result, a DC voltage (hereinafter also referred to as a "full voltage") corresponding to the sum of the DC voltages of the plurality of converter cells 30 between DC nodes OPTA and OPTB occur between DC terminals 102P and 102N.

Although the order of converter cells 30 connected in series may be arbitrarily set, it is preferable to connect converter cells 30 in the order that is advantageous in terms of the insulation design of the transformer. For example, based on the configuration example in FIG. 1, the order of converter cells 30 connected in series on the secondary winding side of transformer 20 is changed to the order of 30R1, 30R2, 30S1, 30S2, 30T1, and 30T2 starting from the high potential side (DC terminal 102P) toward the low potential side (DC terminal 102N). This allows an advantageous insulation design between the secondary windings corresponding to the same phase.

In this way, in power conversion device 10 according to the first embodiment, insulation between an input and an output (i.e., between three-phase AC power supply 101 and each of DC terminals 102P and 102N) is ensured by transformer 20 including a plurality of secondary windings each formed of a single-phase open winding for the primary windings corresponding to multiple phases (for example, three phases of the R-phase, the S-phase, and the T-phase) of AC power supply 101.

Power conversion device 10 further includes a control circuit 400, a sensor value communication unit 410, and a drive circuit 420. Sensor value communication unit 410 transmits, to control circuit 400, detection values obtained by voltage sensors 103, 104 and by a voltage sensor and a current sensor disposed in each converter cell 30. Control circuit 400 is formed of a microcomputer, for example. Using the sensor detection values transmitted by sensor value communication unit 410, control circuit 400 generates a control signal for turning on and off each semiconductor switching element in converter cell 30 formed of a self-excited converter. Drive circuit 420 turns on and off each semiconductor switching element in each converter cell 30 according to the control signal generated by control circuit 400.

Figure 4:
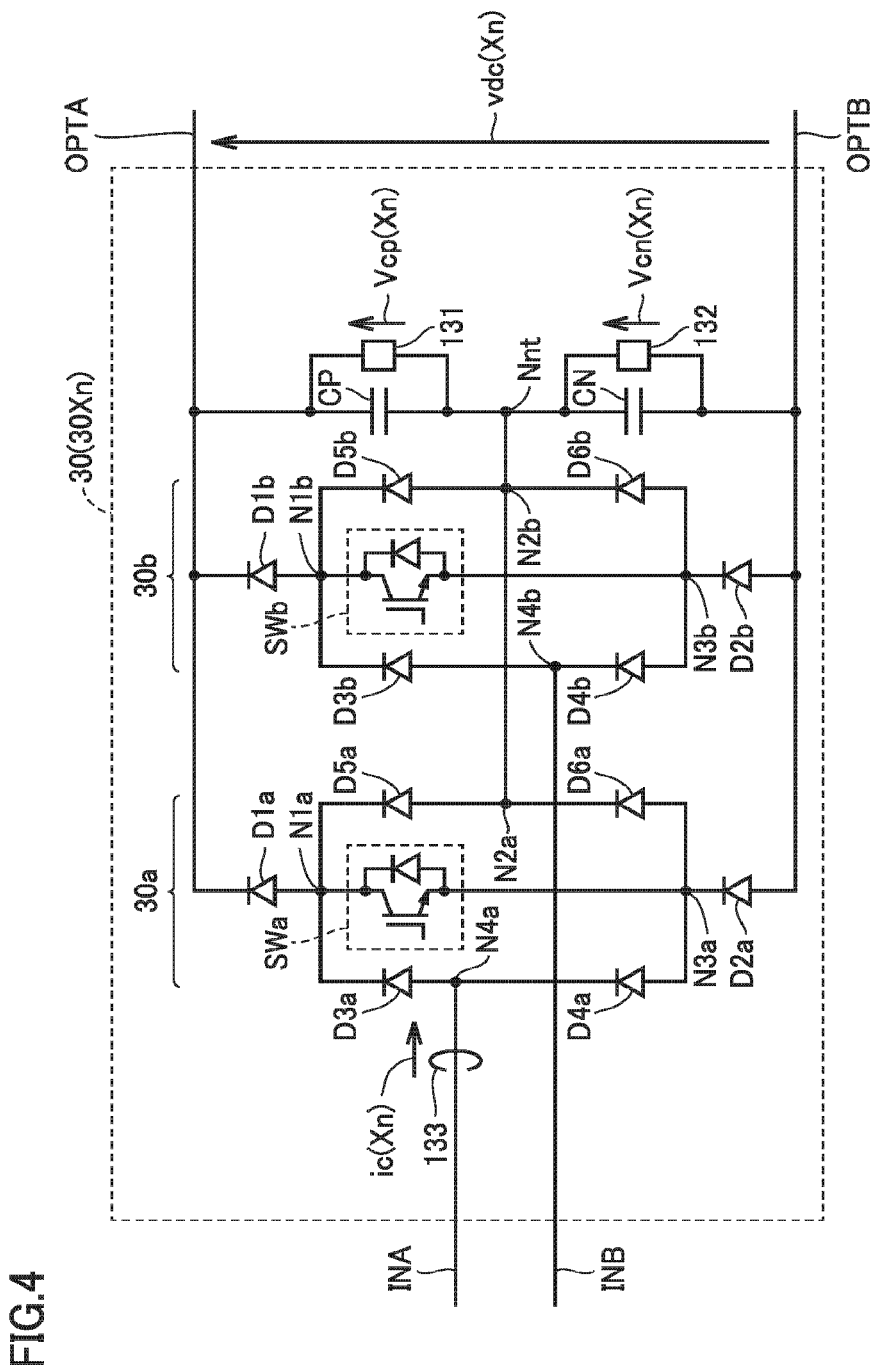
FIG. 4 is a circuit diagram showing an internal configuration example of each converter cell shown in FIG. 1.

FIG. 4 is a circuit diagram showing an internal configuration example of converter cell 30 (30)(n).

Referring to FIG. 4, converter cell 30 is a single-phase converter that performs power conversion with a single-phase alternating current and direct current and that is capable of outputting voltages of three levels to each of paired AC nodes INA and INB.

Converter cell 30 includes: two legs 30a and 30b connected in parallel between DC nodes OPTA and OPTB; and capacitors CP and CN. Leg 30a includes a semiconductor switching element SWa and diodes D1a to D6a. Capacitors CP and CN are connected in series between DC nodes OPTA and OPTB via a neutral point node Nnt. Capacitors CP and CN form a series body capacitor.

Diode D1a is connected between a node N1a and DC node OPTA on the condition that the direction from node N1a to DC node OPTA is defined as a forward direction. Diode D2a is connected between a node N3a and DC node OPTB on the condition that the direction from DC node OPTB to node N3a is defined as a forward direction. Semiconductor switching element SWa is connected between nodes N3a and N1a, and turned on and off by drive circuit 420 according to a control signal from control circuit 400.

Diode D3a is connected between nodes N4a and N1a on the condition that the direction from node N4a to node N1a is defined as a forward direction. Diode D4a is connected between nodes N3a and N4a on the condition that the direction from node N3a to node N4a is defined as a forward direction. Diode D5a is connected between nodes N2a and N1a on the condition that the direction from node N2a to node N1a is defined as a forward direction. Diode D6a is connected between nodes N3a and N2a on the condition that the direction from node N3a to node N2a is defined as a forward direction.

Leg 30b includes a semiconductor switching element SWb and diodes D1b to D6b. Semiconductor switching element SWb and diodes D1b to D6b are connected to DC nodes OUTA, OUTB and nodes N1b to N4b in the same manner as with semiconductor switching element SWa and diodes D1a to D6a in leg 30a.

Node N4a in leg 30a is connected to AC node INA. Node N4b in leg 30b is connected to AC node INB. Node N2a (leg 30a) and node N2b (leg 30b) are electrically connected to neutral point node Nnt of the series body capacitor.

Semiconductor switching elements SWa and SWb each can be formed representatively of an insulated gate bipolar transistor (IGBT). A metal oxide semiconductor field effect transistor (MOSFET), a gate turn off (GTO) thyristor and the like can be used as semiconductor switching elements as long as they can be controlled to be turned on and off according to a signal. In other words, drive circuit 420 drives the voltages on the gates (the control electrodes) of semiconductor switching elements SWa and SWb according to a control signal (specifically, a voltage pulse signal) from control circuit 400. Thereby, semiconductor switching elements SWa and SWb are controlled to be turned on and off by control circuit 400.

Voltage sensors 131, 132 and a current sensor 133 are disposed in each converter cell 30. Voltage sensor 131 detects a voltage Vcp(Xn) of capacitor CR Voltage sensor 132 detects a voltage Vcn(Xn) of capacitor CN. DC voltage Vdc(Xn) between DC nodes OPTA and OPTB can be calculated by computation of Vdc(Xn)=Vcp(Xn)+Vcn(Xn). Current sensor 133 detects an AC current is that flows through AC node INA (or INB).

The above-mentioned voltage values detected by voltage sensors 131, 132 and the above-mentioned current value detected by current sensor 133 in converter cell 30 are transmitted to control circuit 400 by sensor value communication unit 410 (FIG. 1). In the following description, each current value and each voltage value are denoted by reference numerals with suffix (Xn) when the values are distinguished from each other for each converter cell 30.

Converter cell 30 shown in FIG. 4 is based on the circuit generally referred to as a Vienna rectifier. The basic operation of the Vienna rectifier by itself is disclosed in NPL 1 and the like, for example. Due to the restrictions in terms of the circuit configuration, the Vienna rectifier cannot perform regeneration of electric power that is equal in magnitude to the electric power applied in power running. On the other hand, the Vienna rectifier is advantageous in that the number of semiconductor switching elements to be used can be reduced, as compared with the circuit configuration allowing regeneration of electric power that is equal in magnitude to the electric power applied in power running.

In converter cell 30 shown in FIG. 4, during the OFF periods of semiconductor switching elements SWa and SWb, diodes D1a to D4a or diodes D1b to D4b can rectify the AC voltage between AC nodes INA and INB, and output the rectified AC voltage between DC nodes OPTA and OPTB. In other words, the potential on AC node INA is −Vdc(Xn)/2 or Vdc(Xn)/2 in accordance with the polarity of current ic. During the ON period of semiconductor switching element SWa, AC node INA can be set at the same potential as that on neutral point node Nnt of the series body capacitor. Similarly, during the ON period of semiconductor switching element SWb, the voltage on AC node INB can be set to be equal to the voltage on neutral point node Nnt. In this way, each of legs 30a and 30b can output voltages of three levels (−Vdc(Xn)/2, 0, and Vdc(Xn)/2) to AC nodes INA and INB. Thus, the voltage between AC nodes INA and INB can be controlled in five stages (−Vdc(Xn), −Vdc(Xr)/2, 0, Vdc(Xn)/2, and Vdc(Xn)). In this case, it is assumed that the relation of Vdc(Xn)/2=Vcp(Xn)=Vcn(Xn) is set on the condition that the potential on neutral point node Nnt of the series body capacitor is zero.

According to the configuration of power conversion device 10, converter cell 30 is formed of a self-excited converter formed using a semiconductor switching element. Thereby, the operation continuity performance at occurrence of a system fault is improved as compared with the configuration formed using a separately-excited converter, with the result that the reliability is improved. Furthermore, by applying transformer 20 including secondary windings each formed of a single-phase open winding, the transformer can be reduced in size as compared with a multiple phase-shift transformer as in PTL 1, and also, the phases are insulated from each other on the secondary side. As a result, converter cells 30 connected to the secondary windings of different phases can be connected in series between DC terminals 102P and 102N. The number of converter cells 30 connected in series between DC terminals 102P and 102N is (3×k) corresponding to the number of secondary windings. Specifically, the number of converter cells 30 connected in series can be set such that the product of the DC voltage value set in each converter cell 30 and (3×k) is equal to the set voltage between DC terminals 102P and 102N. As the secondary winding of transformer 20 is formed of a single-phase open winding, the number of secondary windings required to ensure the required number of converter cells 30 connected in series can be reduced to one-third as compared with a commonly used three-phase transformer.

Furthermore, by the configuration in which a plurality of secondary windings each formed of a single-phase open winding are disposed to correspond to each phase, the number of converter cells 30 connected in series between DC terminals 102P and 102N is increased. Thereby, the withstand voltage required in one converter cell 30 can be reduced. As a result, a high-speed semiconductor switching element can be readily adopted, thereby allowing a higher frequency of the current ripple in the AC power supply. Accordingly, the passive filter for suppressing this current ripple can be reduced in size.

(Control of Each Converter Cell)

As to power conversion control between three-phase AC power and DC power in power conversion device 10, each converter cell 30Xn can be basically arbitrarily controlled. The following is a preferable example of such control.

Figure 5:
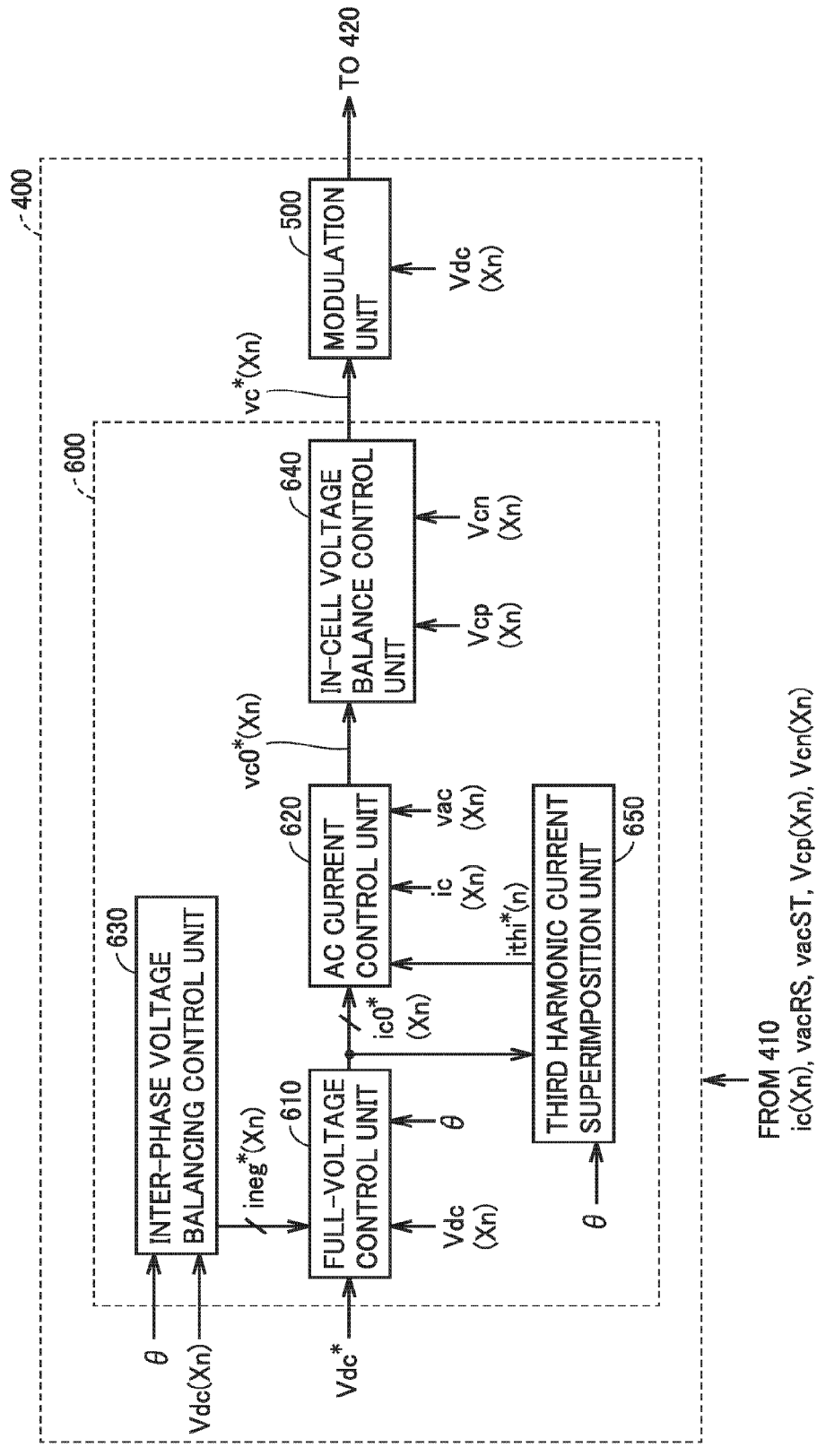
FIG. 5 is a functional block diagram illustrating a control configuration example of each converter cell by a control circuit shown in FIG. 1.

FIG. 5 is a functional block diagram illustrating a control configuration example of each converter cell 30 by control circuit 400. The function of each block illustrated in each of the functional block diagrams including FIG. 5 can be implemented by control circuit 400 executing software processing by executing a program and/or hardware processing by a dedicated electronic circuit. Control circuit 400 controls the semiconductor switching elements in each converter cell 30 to be individually turned on and off. In the following, the configuration for control of each converter cell 30Xn performed in each constant control cycle will be sequentially described.

Referring to FIG. 5, control circuit 400 includes a voltage control unit 600 and a modulation unit 500. Based on the sensor values (Vcp(Xn), Vcn(Xn), vacRS, vacST, ic(Xn)) transmitted from sensor value communication unit 410, voltage control unit 600 generates an AC voltage command value vc*(Xn) for controlling DC voltage Vdc(Xn) between DC nodes OPTA and OPTB to be set at a voltage command value Vdc* and for controlling AC current ic(Xn) such that the power factor of the power supply current on the primary side of transformer 20 is set at 1. Modulation unit 500 generates drive control signals (voltage pulse signals) for semiconductor switching elements SWa and SWb for controlling AC voltage vac(Xn) according to AC voltage command value vc*(Xn). Then, modulation unit 500 outputs the generated drive control signals to drive circuit 420. Also, vac(Xn) is a voltage on the secondary winding of transformer 20 and, strictly speaking, shows the sum of: the voltage occurring between both ends of AC nodes INA and INB; and the voltage applied to the leakage inductance of the secondary winding in transformer 20. For example, vac(Xn) is obtained in the following manner. Specifically, using a known method, the phase voltage in each phase of the primary winding is calculated based on line voltages vacRS and vacST, and multiplied by the turns ratio between the primary winding and the secondary winding, thereby obtaining vac(Xn).

Voltage control unit 600 includes a full-voltage control unit 610, an AC current control unit 620, an inter-phase voltage balancing control unit 630, an in-cell voltage balance control unit 640, and a third harmonic current superimposition unit 650. The computation by voltage control unit 600 is performed for each of three converter cells 30 of the R-phase, the S-phase and the T-phase that are connected to the same secondary winding group SDW.

Figure 6:
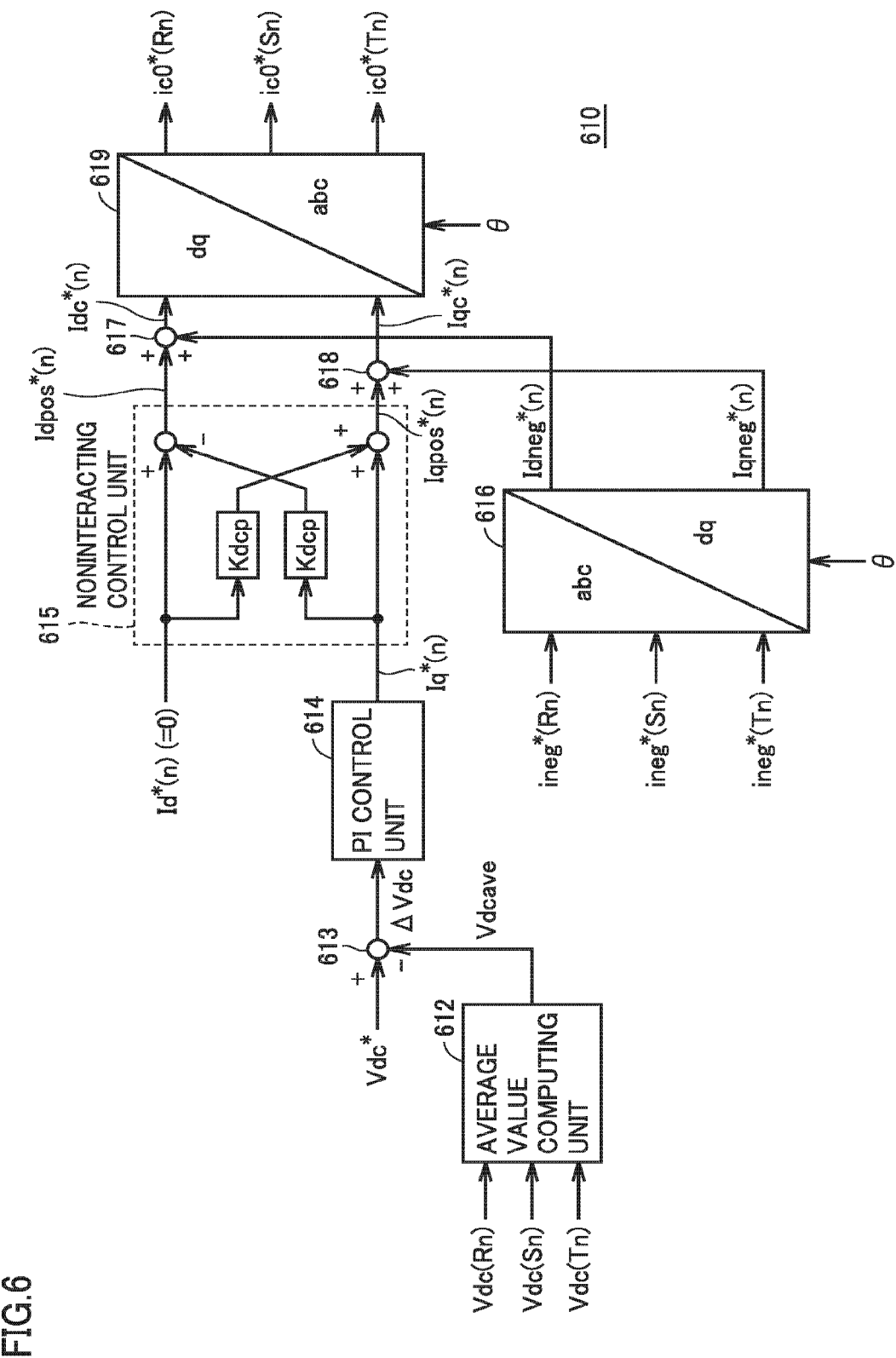
FIG. 6 is a functional block diagram illustrating the configuration of a full-voltage control unit shown in FIG. 5.

FIG. 6 is a functional block diagram illustrating the configuration of full-voltage control unit 610.

Referring to FIG. 6, full-voltage control unit 610 includes an average value computing unit 612, a deviation computing unit 613, a proportional-integral (PI) control unit 614, a noninteracting control unit 615, a coordinate conversion unit 616, addition units 617, 618, and a coordinate inverse conversion unit 619. DC voltage Vdc(Xn) in each converter cell 30 can be calculated in control circuit 400 by adding capacitor voltages Vcp(Xn) and Vcn(Xn).

Average value computing unit 612 calculates a DC voltage average value Vdcav among converter cells 30 of the R-phase, the S-phase and the T-phase that are connected to the same secondary winding group SDW. In other words, DC voltage average value Vdcav is calculated for each secondary winding group SDW, and this DC voltage average value Vdcav is applied in common among converter cells 30 connected to the same secondary winding group SDW.

Deviation computing unit 613 calculates a deviation ΔVdc of DC voltage average value Vdcav calculated by average value computing unit 612 with respect to voltage command value Vdc* (ΔVdc=Vdc*−Vdcav). Voltage command value Vdc* is applied in common among converter cells 30 since it is obtained by dividing the full-voltage command value as the DC voltage command value between DC terminal 102P and 102N by the number of converter cells 30 (3×2=6 in the configuration example in FIG. 1).

In this case, Id*(n) and Iq*(n) (n=1 to k) represent the d-axis current command value and the q-axis current command value, respectively, on the d-q coordinate axis formed of a d-axis and a q-axis orthogonal to each other in each of converter cells 30Xn connected to the same secondary winding group SDW. When d-q inverse conversion is performed using a voltage phase θ of three-phase AC power supply 101, the q-axis current corresponds to an axis equivalent to active power, and the d-axis current corresponds to an axis equivalent to reactive power. Thus, the d-axis current command value as a command value of the reactive current is set at zero so as to set the power factor at 1 (Id*(n)=0). Also, d-q conversion and d-q inverse conversion are performed in coordinate conversion unit 616 and coordinate inverse conversion unit 619, respectively.

By PI control computation, PI control unit 614 calculates a q-axis current command value Iq*(n) so as to minimize deviation ΔVdc. Noninteracting control unit 615 subjects the q-axis current command value and the d-axis current command value to noninteracting computation for correcting the interaction of the q-axis current and the d-axis current by the inductance component existing in three-phase AC power supply 101, transformer 20 and the like.

Specifically, noninteracting control unit 615 compensates for the deviation that occurs between the actually flowing current and the current command value in the converter cell and that is caused by the above-mentioned inductance component with respect to converter cell 30Xn. Noninteracting computation is performed so as to add Kdcp×Id*(n) to q-axis current command value Iq*(n), and to subtract Kdcp×Iq*(n) from d-axis current command value Id*(n). Such noninteracting computation allows suppression of the steady interaction of the q-axis current and the d-axis current through the inductance component. In addition, Kdcp shows a control gain of noninteracting control.

As a result, the command values of the d-axis current and the q-axis current related to the positive-phase current is obtained by the following equations (1) and (2).

$$Idpos^*(n)=Id^*(n)-Kdcp \times Iq^*(n) \quad (1)$$

$$Iqpos^*(n)=Iq^*(n)+Kdcp \times Id^*(n) \quad (2)$$

Positive-phase current command values Idpos*(n) and Iqpos*(n) each correspond to the current command value for controlling DC voltage Vdc(Xn) of each converter cell 30Xn to be set at voltage command value Vdc* (i.e., for controlling the voltage between DC terminals 102P and 102N to be set at a full-voltage command value) in the state where the power factor of the power supply current on the primary side of transformer 20 is set at 1.0.

In the present embodiment, further, "inter-phase voltage balancing control" for equalizing DC voltage Vdc(Xn) among three converter cells 30 connected to the same secondary winding group SDW is performed. In inter-phase voltage balancing control, the command values of the d-axis current and the q-axis current related to a negative-phase current are generated based on negative-phase current command values ineg*(Rn), ineg*(Sn) and ineg*(Tn) (n=1 to k) that are calculated by inter-phase voltage balancing control unit 630 shown in FIG. 7.

Figure 7:
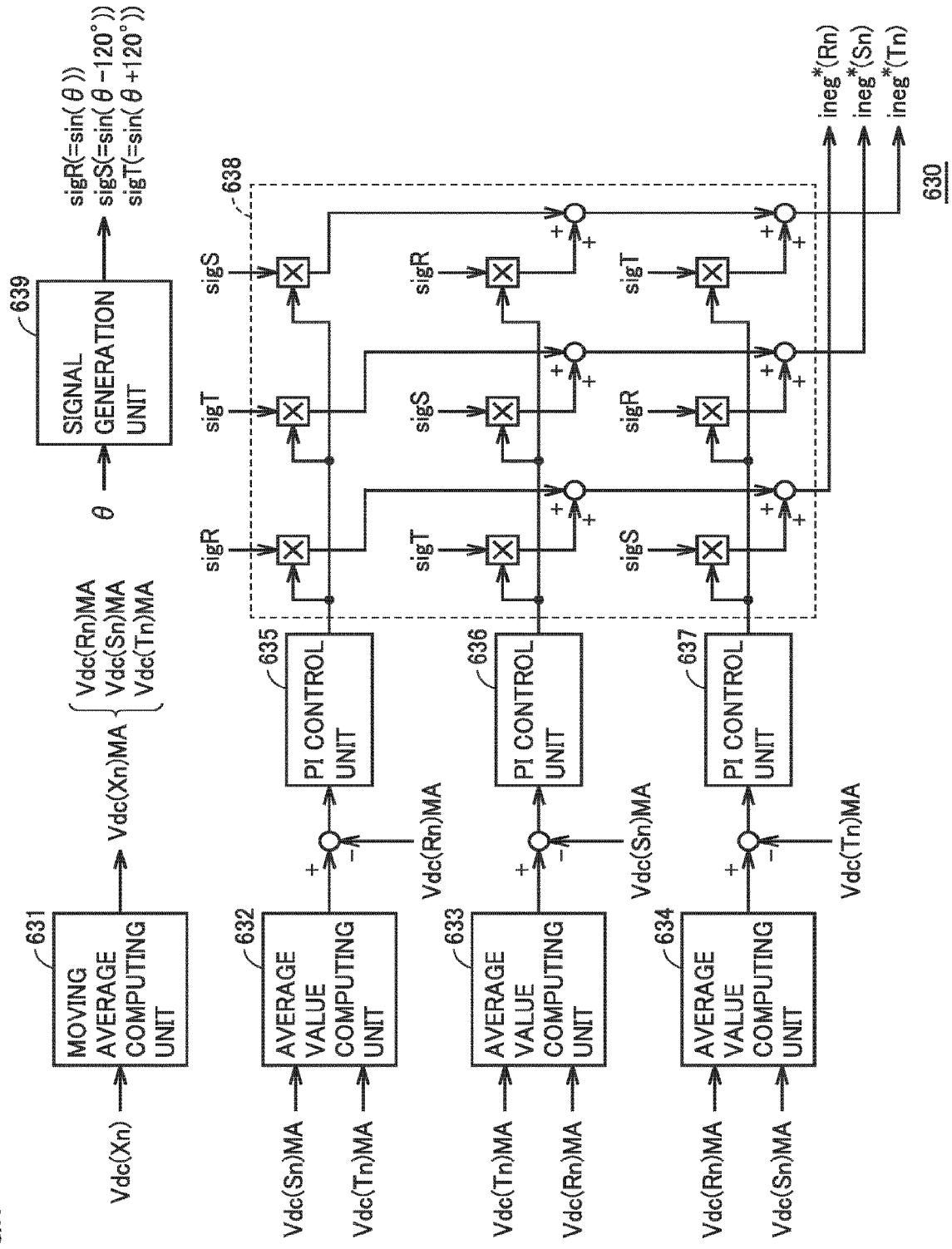
FIG. 7 is a functional block diagram illustrating the configuration of an inter-phase voltage balancing control unit shown in FIG. 5.

Referring to FIG. 7, inter-phase voltage balancing control unit 630 includes a moving average computing unit 631, average value computing units 632 to 634, proportional-integral (PI) control units 635 to 637, an AC signal generation unit 638, and a signal generation unit 639. Inter-phase voltage balancing control unit 630 calculates negative-phase current command values ineg*(Rn), ineg*(Sn), and ineg*(Tn) (n=1 to k) of the respective phases (the R-phase, the S-phase and the T-phase) of the same secondary winding group SDW.

Moving average computing unit 631 calculates the respective moving average values of DC voltages Vdc(Xn) on three converter cells 30 connected to the same secondary winding group SDW. As a result, moving average voltages Vdc(Rn)MA, Vdc(Sn)MA and Vdc(Tn)MA are calculated so as to correspond to the converter cells of the R-phase, the S-phase, and the T-phase, respectively.

Average value computing unit 632 calculates an average value of moving average voltage Vdc(Sn)MA of the S-phase and moving average voltage Vdc(Tn)MA of the T-phase. Furthermore, the voltage deviation of the average value calculated by average value computing unit 632 with respect to moving average voltage Vdc(Rn)MA of the R-phase is computed and input into proportional-integral (PI) control unit 635. PI control unit 635 computes the amplitude of the negative-phase current command value with respect to the R-phase for setting the voltage deviation at zero.

AC signal generation unit 638 multiplies the amplitude calculated by PI control unit 635 by each of AC signals sigR, sigS and sigT from signal generation unit 639 to thereby calculate negative-phase current command values of three phases with respect to the R-phase. Signal generation unit 639 generates AC signals sigR, sigS and sigT based on voltage phase θ of three-phase AC power supply 110. AC signal sigR is a sinusoidal signal that has an amplitude of 1 and that is in phase with voltage phase θ (sigR=sin θ). On the other hand, AC signal sigS is a sinusoidal signal that has an amplitude of 1 and that is delayed in phase by 120 degrees from sigR (sigS=sin (θ−120°)). In contrast, AC signal sigT is a sinusoidal signal that has an amplitude of 1 and that is advanced in phase by 120 degrees from sigR (sigT=sin (θ+120°)).

The negative-phase current with respect to the R-phase means a negative-phase current having an R-phase component that is in phase with the R-phase voltage of three-phase AC power supply 101. Also, the S-phase is advanced in phase by 120° from the R-phase, and the T-phase is delayed in phase by 120° from the R-phase. Thus, the negative-phase current command value with respect to the R-phase is in phase with the AC power supply voltage (R-phase voltage) in the R-phase, and is different in phase by 120° from the AC power supply voltages (the S-phase voltage and the T-phase voltage) in the S-phase and the T-phase.

Accordingly, the negative-phase current command value with respect to the R-phase acts to produce active power having a power factor of 1.0 (the inflow direction) in the R-phase, and to produce active power having a power factor of 0.5 (the outflow direction) in each of the S-phase and the T-phase. This is equivalent to the state where the active power flowing out of the S-phase and the T-phase flows into the R-phase.

When moving average voltage Vdc(Rn)MA in the R-phase becomes smaller than the average value of Vdc(Sn) MA in the S-phase and Vdc(Tn)MA in the T-phase, PI control unit 635 increases the amplitude of the negative-phase current with respect to the R-phase (in the + direction). Thereby, the negative-phase current command value can be set such that the active power flowing out of each of converter cells 30 connected to the S-phase and the T-phase of the same secondary winding group SDW flows into converter cell 30 connected to the R-phase. As a result, DC voltage Vdc(Xn) can be equalized among three converter cells 30 connected to the R-phase, the S-phase and the T-phase of the same secondary winding group SDW.

Also in the S-phase, average value computing unit 633 and PI control unit 636 compute the amplitude of the negative-phase current command value with respect to the S-phase for setting, at zero, the voltage deviation of the average value of moving average voltages Vdc(Tn)MA and Vdc(Rn)MA in the respective T-phase and R-phase with respect to moving average voltage Vdc(Sn)MA in the S-phase. Furthermore, AC signal generation unit 638 multiplies the amplitude calculated by PI control unit 636 by each of AC signals sigR, sigS and sigT, thereby calculating the negative-phase current command value with respect to the S-phase.

Similarly, also in the T-phase, the amplitude of the negative-phase current command value with respect to the T-phase calculated by average value computing unit 634 and PI control unit 637 is multiplied by each of AC signals sigR, sigS and sigT, thereby calculating the negative-phase current command value with respect to the T-phase.

AC signal generation unit 638 sums the negative-phase current command values with respect to the R-phase, the S-phase and the T-phase to thereby calculate negative-phase current command values ineg*(Rn), ineg*(Sn) and ineg* (Tn) (n=1 to k) of the respective phases.

Again referring to FIG. 6, coordinate conversion unit 616 performs d-q conversion using voltage phase θ of three-phase AC power supply 101, for negative-phase current command values ineg*(Rn), ineg*(Sn) and ineg*(Tn) of the three phases obtained by inter-phase voltage balancing control unit 630. Thereby, a d-axis current command value Idneg*(n) and a q-axis current command value Iqneg*(n) with respect to the negative-phase current are obtained.

Voltage phase θ is a voltage phase of three-phase AC power supply 101. For example, the detection value of the three-phase AC voltage of AC power supply 101 is input into control circuit 400 to generate a phase synchronization signal by a phase locked loop (PLL) and the like in control circuit 400, with the result that a periodic signal having voltage phase θ can be obtained.

Addition unit 617 adds the d-axis current command values of the positive-phase current and the negative-phase current, to thereby calculate a d-axis current command value Idc*(n). Similarly, addition unit 618 adds the q-axis current command values of the positive-phase current and the negative-phase current to thereby calculate a q-axis current command value Iqc*(n).

Coordinate inverse conversion unit 619 performs d-q inverse conversion using voltage phase θ of three-phase AC power supply 101 for d-axis current command values Idc* (n) and Iqc*(n) calculated as described above, to thereby calculate current command values ic0*(Rn), ic0*(Sn) and ic0*(Tn) (n=1 to k) of the respective phases (the R-phase, the S-phase and the T-phase) of the same secondary winding group SDW. By performing three-phase conversion with respect to the above-mentioned voltage phase θ, current command values ic0*(Rn), ic0*(Sn) and ic0*(Tn) are generated as AC voltages of the R-phase, the S-phase and the T-phase of AC power supply 101, i.e., as sinusoidal currents that are equal in frequency to the primary side of transformer 20.

As shown in FIG. 5, current command values ic0*(Rn), ic0*(Sn) and ic0*(Tn) of three phases calculated by full-voltage control unit 610 are input into AC current control unit 620. Current command value ic0*(Xn) shown in the figure comprehensively indicates ic0*(Rn) of the R-phase, ic0*(Sn) of the S-phase, and ic0*(Tn) of the T-phase. AC current ic(Xn) of converter cell 30Xn is controlled according to current command value ic0*(Xn). Furthermore, AC current control unit 620 can control AC current ic(Xn), using the input from third harmonic current superimposition unit 650, according to the AC current command value obtained by superimposing the third harmonic on the sinusoidal current.

Figure 8:
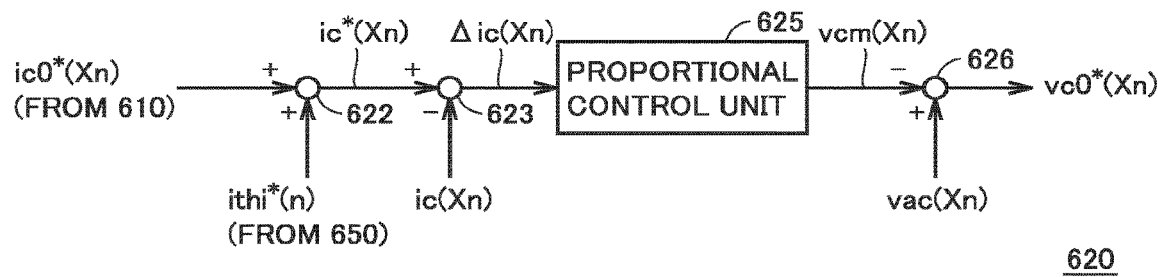
FIG. 8 is a functional block diagram illustrating the configuration of an AC current control unit shown in FIG. 5.

FIG. 8 is a functional block diagram illustrating the configuration of AC current control unit 620.

Referring to FIG. 8, AC current control unit 620 includes an addition unit 622, a deviation computing unit 623, a proportional control unit 625, and a subtraction unit 626. In addition, current command values ic0*(Rn), ic0*(Sn) and ic0*(Tn) each are a sinusoidal current obtained by d-q inverse conversion using voltage phase θ of three-phase AC power supply 101. Thus, in the following description, current command value ic0*(Xn) will also be referred to as a sinusoidal current command value ic0*(Xn).

In each of the phases, addition unit 622 adds a third harmonic current command value ithi*(n), which is set for each secondary winding group SDW and obtained from third harmonic current superimposition unit 650, to sinusoidal current command value ic0*(Xn) as a fundamental wave component.

Figure 9:
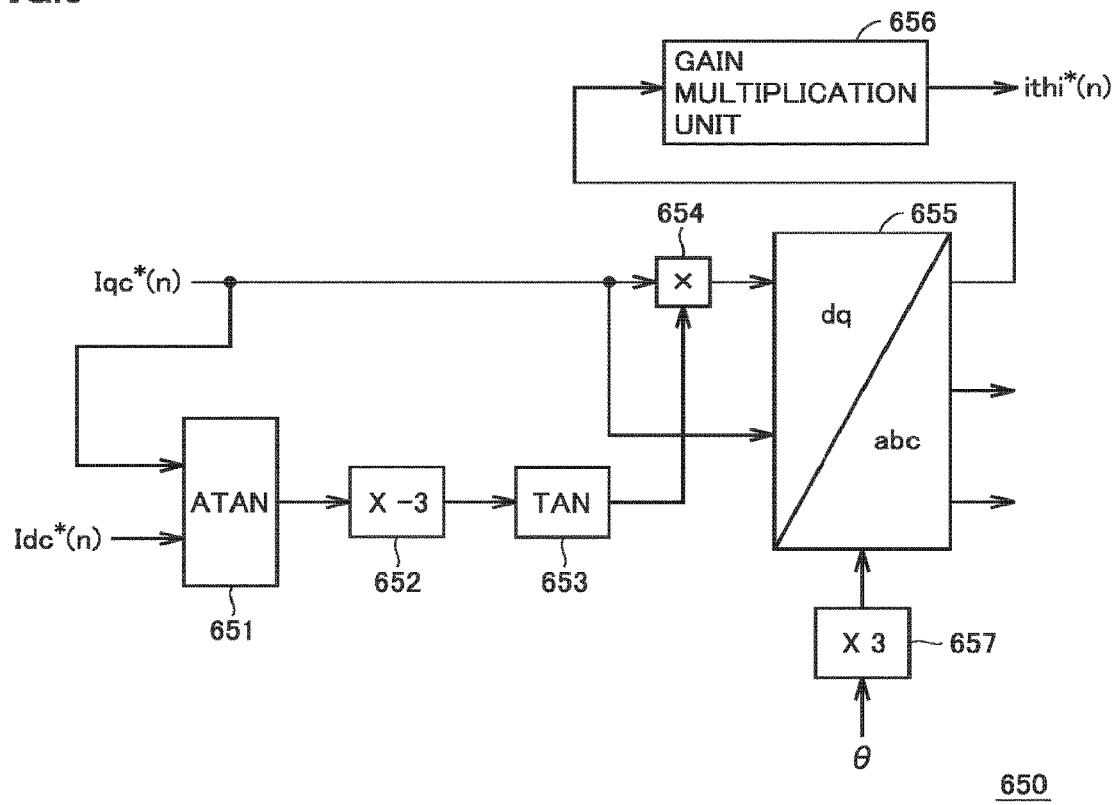
FIG. 9 is a functional block diagram illustrating the configuration of a third harmonic current superimposition unit shown in FIG. 5.

FIG. 9 is a functional block diagram illustrating the configuration of third harmonic current superimposition unit 650.

Referring to FIG. 9, third harmonic current superimposition unit 650 includes a tangent inverse function computing unit 651, multiplication units 652, 654, 657, a tangent function computing unit 653, coordinate inverse conversion unit 655, and a gain multiplication unit 656.

Tangent inverse function computing unit 651 computes a tangent inverse function of tan φ for each control cycle. In this case, ta φ is represented by the following equation (3) using d-axis current command value Idc*(n) and q-axis current command value Iqc*(n) that are calculated by full-voltage control unit 610 (FIG. 6).

$$\tan \phi = Idc^*(n)/Iqc^*(n) \quad (3)$$

Accordingly, the output from tangent inverse function computing unit 651 corresponds to the deviation of the phase of current command value ic0*(Xn) with respect to the voltage phase of three-phase AC voltage source 101. When the phase of the third harmonic component is shifted by the same deviation of the phase of current command value ic0*(Xn) with respect to the voltage phase of three-phase AC voltage source 101, a threefold larger initial phase is required with respect to the third harmonic. Thus, multiplication unit 652 multiplies the phase ($\tan^{-1}\phi$) obtained by tangent inverse function computing unit 651 by 3. Based on the output from multiplication unit 652, tangent function computing unit 653 outputs the value equivalent to the ratio between the d-axial component and the q-axial component of the third harmonic in synchronization with the initial phase of the fundamental wave component.

Multiplication unit 654 multiplies q-axis current command value Iqc*(n) by the output value of tangent function computing unit 653, to generate a d-axis current command value of the third harmonic. On the other hand, the q-axis current command value of the third harmonic is fixed by the above-mentioned q-axis current command value Iqc*(n). Thereby, multiplication unit 654 obtains the value of the d-axial component required for derivation of the third harmonic in the case where q-axis current command value Iqc*(n) is fixed.

Coordinate inverse conversion unit 655 performs d-q inverse conversion using 30 obtained by multiplication unit 657 and changing at the frequency that is three times as large as phase θ of the fundamental wave used in coordinate conversion unit 616 and coordinate inverse conversion unit 619, and thereby, generates a third harmonic signal in synchronization with the initial phase of the fundamental wave. As is known in the art, the third harmonic of three-phase alternating current is a signal in common among the phases. Gain multiplication unit 656 multiplies the third harmonic signal obtained by coordinate inverse conversion unit 655 by a predetermined gain Kthi to thereby calculate third harmonic current command value ithi*(n).

When the absolute value of gain Kthi is excessively large, the amplitude of AC current ic(Xn) is increased, which may lead to a harmful influence such as increased loss. Thus, gain Kthi is set in advance at a value so as to achieve the amplitude of third harmonic current command value ithi*(n). For example, it is preferable that gain Kthi is set at a value such that the amplitude of the third harmonic current is 0.1 times to 0.3 times as large as the amplitude of the fundamental wave component.

Again referring to FIG. 8, addition unit 622 adds third harmonic current command value ithi*(n) to a sinusoidal current command value ic0*(Xn) of each phase, to thereby calculate an AC current command value ic*(Xn). As described above, third harmonic current command value ithi*(n) is in common among secondary winding groups SDWn (n: 1 to k).

Figure 10:
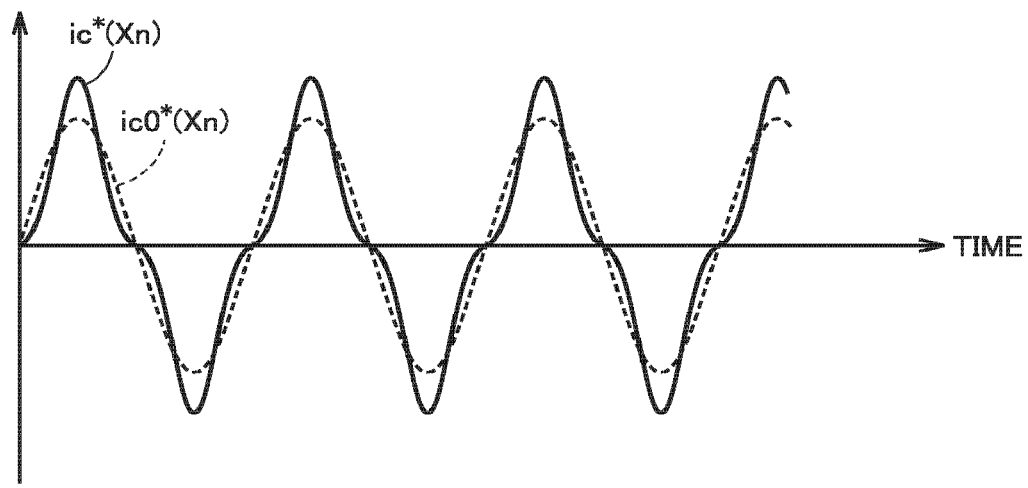
FIG. 10 is a conceptual waveform diagram illustrating superimposition of a third harmonic on an AC current command value.

FIG. 10 shows a conceptual waveform diagram illustrating superimposition of the third harmonic on the AC current command value.

Referring to FIG. 10, by addition of third harmonic current command value ithi*(n), a distortion caused by superimposition of the third harmonic occurs in AC current command value ic*(Xn). By this distortion, a time period having a certain length during which the current is close to zero can be provided at and around the zero cross point. As a result, by applying a circuit configuration in which the current actually flowing through converter cell 30 is forcedly set at zero in the case where AC current command value ic*(Xn) and AC voltage vac(Xn) of converter cell 30Xn are out of phase with each other, the current deviation at and around the zero cross point can be automatically reduced. For example, when the configuration of the Vienna rectifier is applied to the configuration of converter cell 30 as illustrated in FIG. 4, the above-mentioned effect can be achieved. Thereby, the current distortion in converter cell 30 can be reduced.

As to the third harmonic components superimposed on respective AC current command values ic*(Rn), ic*(Sn) and ic*(Tn) of three phases, the total sum of these third harmonic components of three phases is always zero since the primary windings are three-phase star connected. Thus, no influence is exerted upon the power supply current in three-phase AC power supply 101.

Again referring to FIG. 8, deviation computing unit 623 calculates a current deviation Δic(Xn) between AC current command value ic*(Xn) and actual AC current ic(Xn) (Δic(Xn)=ic*(Xn)−ic(Xn)) for converter cell 30Xn.

Proportional control unit 625 calculates a voltage control value vcm(Xn) by P control computation for setting current deviation Δic(Xn) at zero. Subtraction unit 626 subtracts, from AC voltage vac(Xn), voltage control value vcm(Xn) calculated by proportional control unit 625, to thereby calculate an AC voltage command value vc0*(Xn).

It is understood that AC voltage command value vc0*(Xn) is generated by correcting AC voltage vac(Xn) using voltage control value vcm(Xn) for controlling AC current ic(Xn) to be set at AC current command value ic*(Xn). This allows compensation for the influence caused by the impedance component of transformer 20, and allows the phase of AC current ic(Xn) to be controlled such that each phase voltage of AC power supply 101 and each phase power supply current are synchronized in phase with each other. Furthermore, the amplitude of AC current ic(Xn) can be controlled to become equal to the amplitude of AC current command value ic*(Xn). The amplitude of AC current command value ic*(Xn) is for controlling DC voltage Vdc(Xn) to be set at voltage command value Vdc*.

Again referring to FIG. 5, AC voltage command value vc0*(Xn) calculated by AC current control unit 620 can be further corrected by in-cell voltage balance control unit 640 such that a balance is achieved between capacitor voltages Vcp(Xn) and Vcn(Xn) in converter cell 30Xn.

Figure 11:
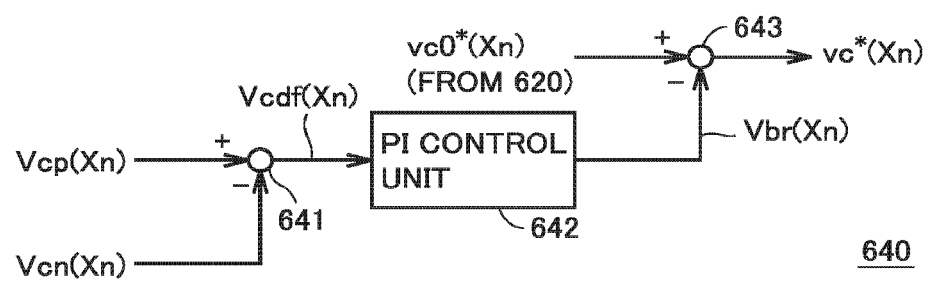
FIG. 11 is a functional block diagram illustrating the configuration of an in-cell voltage balance control unit shown in FIG. 5.

FIG. 11 is a functional block diagram illustrating the configuration of in-cell voltage balance control unit 640.

Referring to FIG. 11, in-cell voltage balance control unit 640 includes a deviation computing unit 641, a PI control unit 642, and a subtraction unit 643.

Deviation computing unit 641 calculates a capacitor voltage difference Vcdf(Xn) that is a voltage difference between capacitor voltages Vcp(Xn) and Vcn(Xn) in converter cell 30Xn (Vcdf(Xn)=Vcp(Xn)−Vcn(Xn)).

PI control unit 642 calculates a balance correction value Vbr(Xn) by PI control computation based on capacitor voltage difference Vcdf(Xn). Subtraction unit 643 subtracts balance correction value Vbr(Xn) from AC voltage command value vc0*(Xn) that is obtained from AC current control unit 620, thereby calculating a final AC voltage command value vc*(Xn).

AC voltage command value vc0*(Xn) is a sinusoidal voltage whose average value is zero, whereas final AC voltage command value vc*(Xn) is added equivalently with a DC bias component corresponding to balance correction value Vbr(Xn). This DC bias component can cause a difference between the charging time periods of capacitors CP and CN in converter cell 30Xn. In other words, balance correction value Vbr(Xn) is calculated so as to add, to AC voltage command value vc0*(Xn), the DC bias that decreases the charging time period of capacitor CP and increases the charging time period of capacitor CN in the case where Vcdf(Xn)>0 (Vcp(Xn)>Vcn(Xn)). By providing such a difference between the charging time periods, the voltage difference between capacitor voltages Vcp(Xn) and Vcn(Xn) can be cancelled.

Again referring to FIG. 5, final AC voltage command value vc*(Xn) calculated by in-cell voltage balance control unit 640 is transmitted from voltage control unit 600 to modulation unit 500. For example, by pulse width modulation (PWM) control according to the comparison between the carrier wave and the AC voltage command value, modulation unit 500 generates drive control signals Qa(Xn) and Qb(Xn) for controlling semiconductor switching elements SWa and SWb, respectively, to be turned on and off in converter cell 30Xn.

Figure 12:
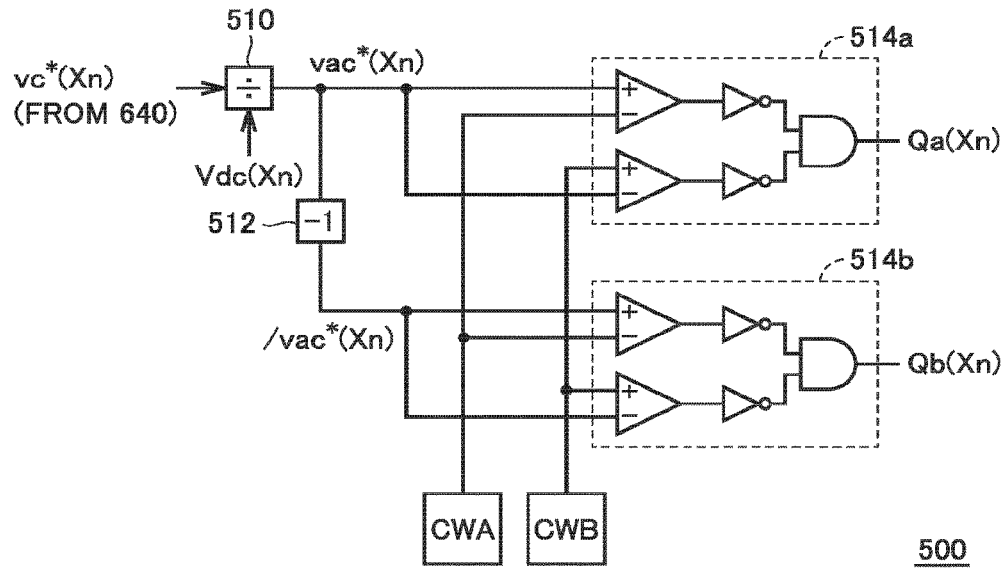
FIG. 12 is a functional block diagram illustrating a configuration example of a modulation unit shown in FIG. 5.

FIG. 12 is a functional block diagram illustrating a configuration example of modulation unit 500.

Referring to FIG. 12, modulation unit 500 includes a division unit 510, a multiplication unit 512, and signal generation units 514a and 514b.

Division unit 510 divides AC voltage command value vc*(Xn) by DC voltage Vdc(Xn) to calculate a normalized AC voltage command value vac*(Xn). In view of the fact that the voltage that can be output between AC nodes INA and INB ranges from −Vdc(Xn) to Vdc(Xn) in converter cell 30Xn, division by DC voltage Vdc(Xn) causes normalization for voltage comparison between carrier waves CWA and CWB, in each of which the width between the maximum value and the minimum value is 1.

Multiplication unit 512 multiplies AC voltage command value vac*(Xn), which is normalized by division unit 510, by "−1". This results in an AC voltage command value /vac*(Xn) that is an inversion of AC voltage command value vac*(Xn).

Signal generation unit 514a generates a drive control signal Qa(Xn) according to the voltage comparison between AC voltage command value vac*(Xn) and each of carrier waves CWA and CWB. Similarly, signal generation unit 514b generates a drive control signal Qb(Xn) according to the voltage comparison between AC voltage command value /vac*(Xn) and each of carrier waves CWA and CWB.

Figure 13:
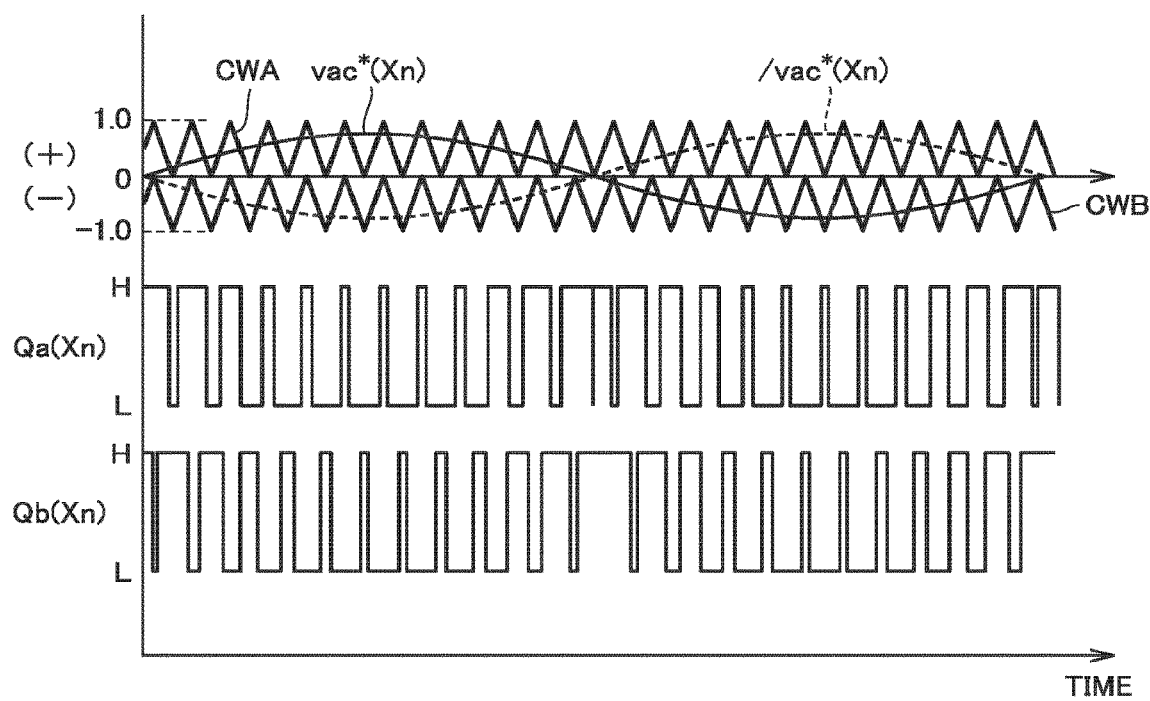
FIG. 13 is an operation waveform diagram of a signal generation unit shown in FIG. 12.

FIG. 13 shows an operation waveform diagram of signal generation units 514a and 514b. For ease of understanding the explanation, FIG. 13 shows an example in the case where balance correction value Vbr(Xn)=0, and AC voltage command values vac*(Xn) and /vac*(Xn) each are a sinusoidal wave.

Referring to FIG. 13, carrier wave CWA has a voltage value that cyclically changes in a positive voltage region, i.e., in a range of the normalized voltage value of 0 to 1.0. On the other hand, carrier wave CWB has a voltage value that cyclically changes in a negative voltage region, i.e., in a range of the normalized voltage value of 0 to −1.0. The frequencies of carrier waves CWA and CWB (hereinafter also referred to as a "carrier frequency") correspond to the switching frequencies of semiconductor switching elements SWa and SWb.

For example, a triangular wave can be used as each of carrier waves CWA and CWB. In the example in FIG. 13, carrier wave CWA is a triangular wave having an offset of 0.5 and an amplitude of 0.5 while carrier wave CWB is a triangular wave having an offset of −0.5 and an amplitude of 0.5.

In a region where AC voltage command value vac*(Xn) >0, signal generation unit 514a sets drive control signal Qa(Xn) at a logic high level (hereinafter also simply referred to as an "H level") when AC voltage command value vac*(Xn) is lower than the voltage of carrier wave CWA, and sets drive control signal Qa(Xn) at a logic low level (hereinafter also simply referred to as an "L level") when AC voltage command value vac*(Xn) is higher than the voltage of carrier wave CWA.

In contrast, in the region where AC voltage command value vac*(Xn)<0, drive control signal Qa(Xn) is set at an H level when AC voltage command value vac*(Xn) is higher than the voltage of carrier wave CWB, whereas drive control signal Qa(Xn) is set at an L level when AC voltage command value vac*(Xn) is lower than the voltage of carrier wave CWB.

Similarly, in the region where AC voltage command value /vac*(Xn)<0, signal generation unit 514b sets drive control signal Qb(Xn) at an H level when AC voltage command value /vac*(Xn) is higher than the voltage of carrier wave CWB, and sets drive control signal Qb(Xn) at an L level when AC voltage command value /vac*(Xn) is lower than the voltage of carrier wave CWB.

Furthermore, in the region where AC voltage command value /vac*(Xn)>0, drive control signal Qb(Xn) is set at an H level when AC voltage command value /vac*(Xn) is lower than the voltage of carrier wave CWA, whereas drive control signal Qb(Xn) is set at an L level when AC voltage command value /vac*(Xn) is higher than the voltage of carrier wave CWA.

Drive circuit 420 turns on semiconductor switching element SWa in converter cell 30Xn when drive control signal Qa(Xn) is at an H level, and turns off semiconductor switching element SWa in converter cell 30Xn when drive control signal Qa(Xn) is at an L level. Similarly, in converter cell 30Xn, semiconductor switching element SWb is turned on when drive control signal Qb(Xn) is at an H level, whereas semiconductor switching element SWb is turned off when drive control signal Qb(Xn) is at an L level.

In leg 30a in converter cell 30 shown in FIG. 4, when semiconductor switching element SWa is on, AC node INA is connected to neutral point node Nnt of the capacitor series body, and leg 30a outputs zero voltage. On the other hand, when semiconductor switching element SWa is off, the voltage on AC node INA attains +Vcp(Xn) or −Vcn(Xn) in accordance with the current polarity. Similarly, in leg 30b, zero voltage is output to AC node INB during the ON period of semiconductor switching element SWb, whereas the voltage on AC node INB attains +Vcp(Xn) or −Vcn(Xn) in accordance with the current polarity during the OFF period of semiconductor switching element SWb.

Thus, as semiconductor switching elements SWa and SWb are controlled to be turned on and off by PWM control shown in FIG. 13, the voltage between AC nodes INA and INB is controlled to change according to AC voltage command value vac*(Xn) used for controlling AC current ic(Xn) according to AC current command value ic*(Xn).

As a result, in converter cell 30Xn of power conversion device 10 according to the first embodiment, DC voltage Vdc(Xn) and AC current ic(Xn) can be controlled according to the command value as semiconductor switching elements SWa and SWb are controlled to be turned on and off.

According to modulation unit 500, the harmonic component that occurs in the voltage between AC nodes INA and INB in one converter cell 30Xn is dominantly a frequency component depending on the carrier frequency. Specifically, voltage fluctuations in the carrier frequency occurs in the output from each of legs 30a and 30b, and two legs are disposed in each converter cell 30Xn for conversion of single-phase AC power. Thus, it is understood that the dominant harmonic component of the voltage between AC nodes INA and INB in converter cell 30Xn has a frequency that is twice as high as the carrier frequency.

In addition, in the configuration including two (k=2) secondary winding groups SDW as shown in FIGS. 1 and 2, it is preferable to provide a phase difference between carrier waves CWA and CWB between converter cells 30 connected to different secondary winding groups SDW.

Figure 14:
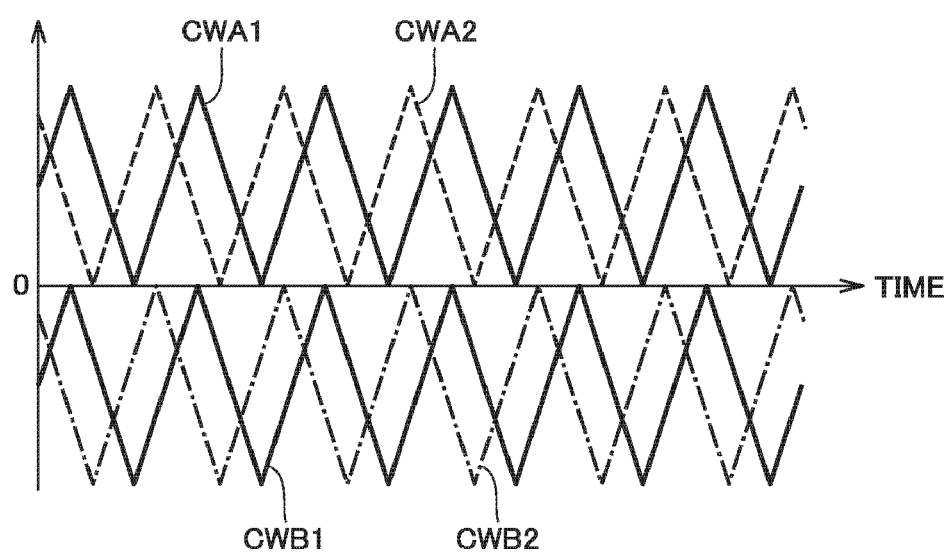
FIG. 14 is a conceptual waveform diagram for illustrating a phase difference provided in a carrier wave between secondary winding groups.

FIG. 14 is a conceptual waveform diagram for illustrating a phase difference provided in a carrier wave between the secondary winding groups.

Referring to FIG. 14, two carrier waves CWA and two carrier waves CWB are provided to correspond to each of two secondary winding groups SDW1 and SDW2 shown in FIGS. 1 and 2. For example, carrier waves CWA1 and CWB1 are used by modulation unit 500 for controlling converter cell 30X1 connected to secondary winding group SDW1. Carrier waves CWA2 and CWB2 are used by modulation unit 500 for controlling converter cell 30X2 connected to secondary winding group SDW2.

In the same manner as in FIG. 13, carrier waves CWA1 and CWB1 are in phase while carrier waves CWA2 and CWB2 are in phase. Also, a phase difference of 90° ($\pi/2$) is provided between carrier waves CWA1 and CWA2, and between carrier waves CWB1 and CWB2.

In this way, in the current of primary winding group PRW of transformer 20, the current ripples resulting from the harmonic component of the voltage between AC nodes INA and INB of converter cell 30Xn cancel each other out. As a result, the current ripple that occurs in the primary winding of transformer 20 has a frequency that is obtained by multiplying the twofold higher frequency than the above-mentioned carrier frequency by the number (k=2) of provided secondary winding groups SDW, i.e., a frequency that is four times as high as the carrier frequency.

In the case where the current ripple is suppressed by a passive filter, the current ripple can be suppressed by a small-sized passive filter since the impedance can be more readily ensured as the ripple frequency is higher. Thus, the phase difference as described above is provided to thereby allow downsizing of the passive filter disposed on the primary side of transformer 20 for current ripple suppression in AC power supply 101.

The phase difference between the carrier waves shown in FIG. 14 can be increased in accordance with the optional number of provided secondary winding groups SDW each having an R-phase, an S-phase and a T-phase. As described above, AC voltage command value vac*(Xn) is computed by voltage control unit 600 for each three converter cells 30 connected to the same secondary winding group SDW, i.e., for each secondary winding group SDW. Accordingly, by providing k carrier waves CWA and k carrier waves CWB in accordance with the number k of provided secondary winding groups SDW, and also by providing a phase difference by (r/k) between k carrier waves, similar effects can be achieved.

Also, voltage control unit 600 can be configured by full-voltage control unit 610 and AC current control unit 620 as a minimum control function in the control configuration shown in FIG. 6. In this case, without providing coordinate conversion unit 616 and addition units 617, 618 in FIG. 6, d-axis current command value Idpos*(n) and q-axis current command value Iqpos*(n) of the positive-phase current are subjected to d-q inverse conversion, to thereby calculate AC current command value ic0*(Xn). Furthermore, in FIG. 8, AC voltage command value vc0*(Xn) can be calculated on the condition that ithi*(n)=0, i.e., ic*(Xn)=ic0*(Xn). In FIG. 11, on the condition that balance correction value Vbr(Xn)=0, voltage command value vc0*(Xn) can be input, with no change, as AC voltage command value vc*(Xn) to modulation unit 500. Thereby, a basic control configuration for each converter cell 30Xn is achieved for controlling DC voltage Vdc(Xn) to be set at voltage command value Vdc* and for controlling AC current ic(Xn) according to the current command value for a power factor of 1.0.

By adding inter-phase voltage balancing control unit 630 to the above-mentioned basic configuration, d-q inverse conversion is performed for d-q current command values Idc*(n) and Iqc*(n) to which respective negative-phase current command values Idneg*(n) and Iqneg*(n) are added, to thereby allow calculation of AC current command value ic*(Xn). Thus, DC voltage Vdc(Xn) can be balanced among converter cells 30Xn connected to the same secondary winding group SDW, i.e., among the R-phase, the S-phase and the T-phase.

Furthermore, by adding third harmonic current superimposition unit 650 to the above-mentioned basic configuration, AC current ic(Xn) can be controlled according to AC current command value ic*(Xn) on which the third harmonic is superimposed. Thereby, in the case where the configuration of a Vienna rectifier is applied to converter cell 30Xn, the distortion in the power supply current can be reduced.

Furthermore, by adding in-cell voltage balance control unit 640 to the above-mentioned basic configuration, the DC bias component for compensating for the voltage difference between capacitor voltages Vcp(Xn) and Vcn(Xn) (balance correction value Vbr(Xn)) can be reflected in AC voltage command value vc*(Xn). Thereby, capacitor voltages Vcp (Xn) and Vcn (Xn) can be balanced in each converter cell 30Xn.

In this way, some or all of inter-phase voltage balancing control unit 630, in-cell voltage balance control unit 640, and third harmonic current superimposition unit 650 are added to the basic configuration formed of full-voltage control unit 610 and AC current control unit 620, with the result that the control function can be enhanced.

Figure 15:
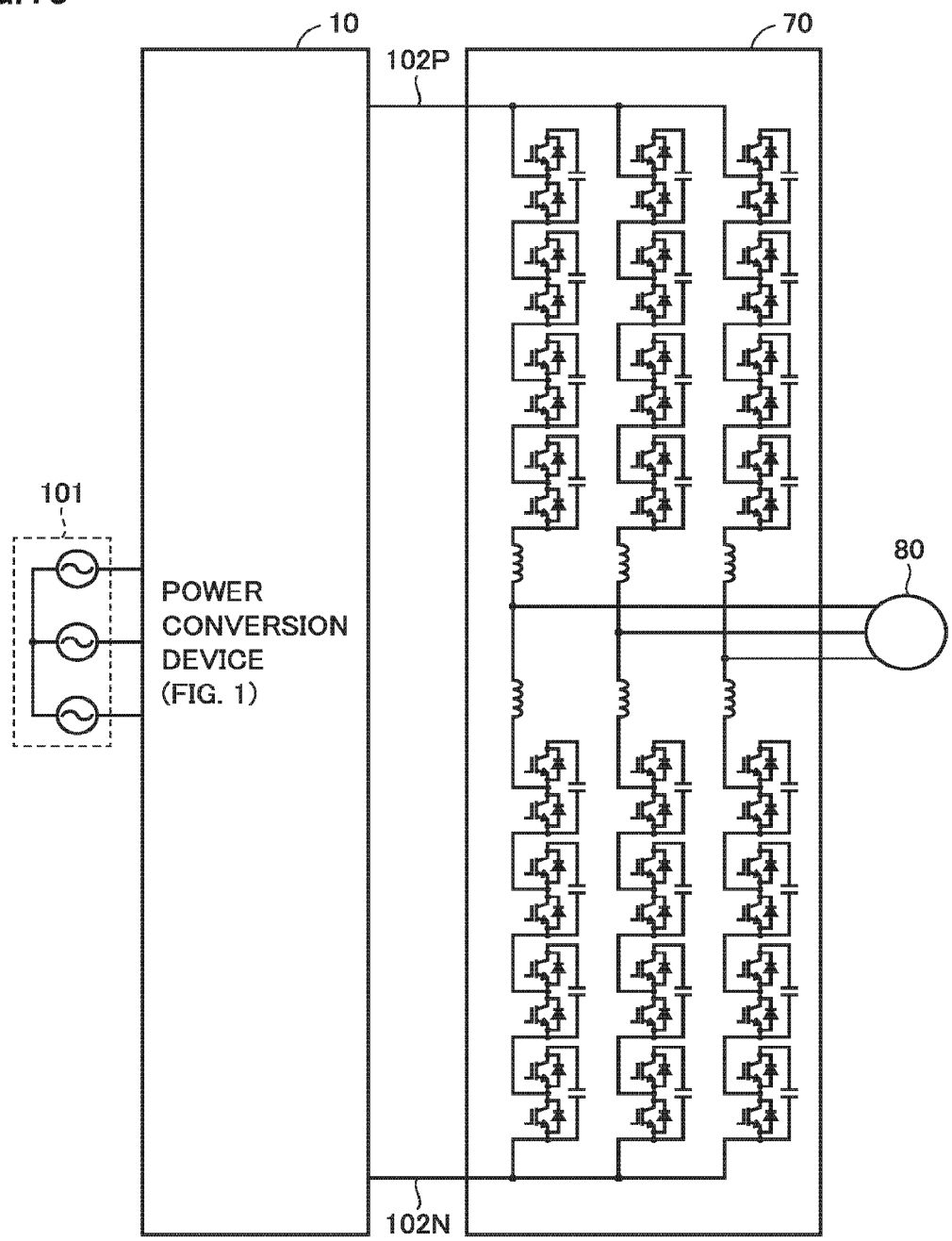
FIG. 15 is a block diagram illustrating a configuration example of a load connected to a DC terminal of the power conversion device according to the first embodiment.

The following is an explanation with reference to FIG. 15 about a configuration example of a load connected to DC terminals 102P and 102N of power conversion device 10.

Referring to FIG. 15, a modular multilevel converter (MMC) 70 for a motor drive device is connected to DC terminals 102P and 102N. MMC 70 converts the DC voltage (full voltage) on each of DC terminals 102P and 102N into an AC voltage and supplies the converted AC voltage to an AC motor 80. In the example in FIG. 15, AC motor 80 is a three-phase AC motor and receives a three-phase AC voltage supplied from MMC 70. Since power conversion by MMC 70 can be performed by applying any known methods, the detailed description thereof will not be made.

As described above, the combination of power conversion device 10 and MMC 70 according to the present embodiment allows support for driving of a high voltage motor that achieves a full voltage of 3 (kV) or more, i.e., a line voltage of 3 (kV) or more. Specifically, in the application not requiring power regeneration by a fan, a blower or the like for driving a high voltage motor, by applying converter cell 30 to which the configuration of the Vienna rectifier shown in FIG. 3 is applied, the number of semiconductor switching elements in each converter cell 30 can be reduced, with the result that power conversion device 10 can be reduced in size.

Second Embodiment

The second embodiment will be described below with reference to a modification of converter cell 30.

Figure 16:
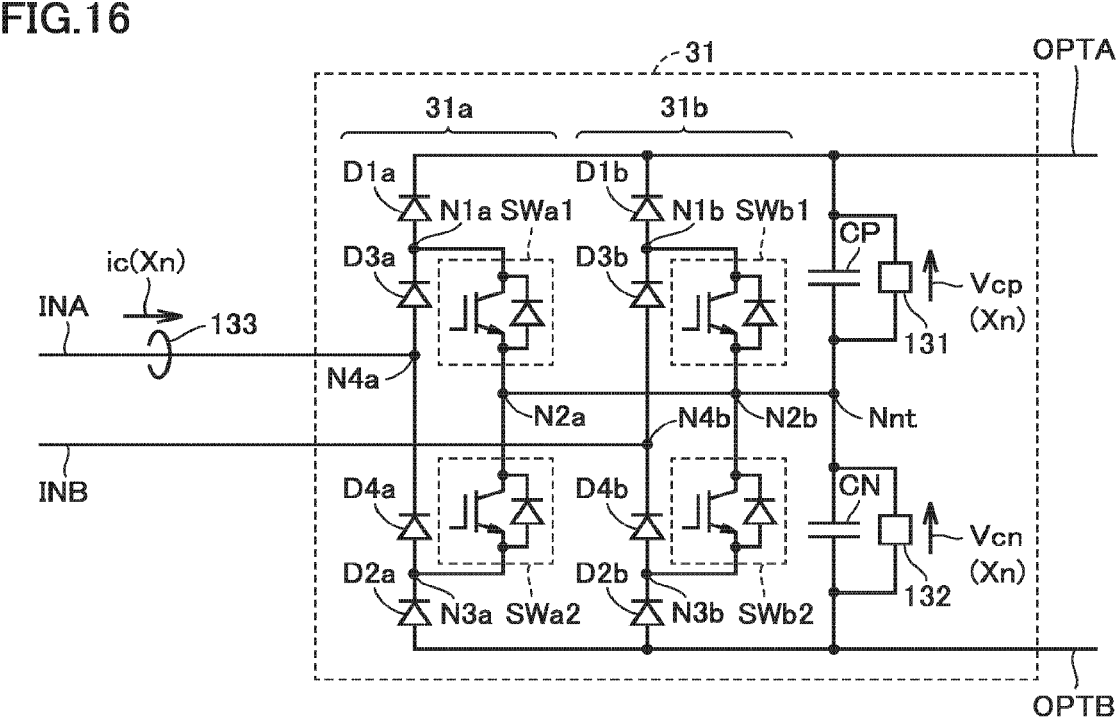
FIG. 16 is a circuit diagram showing the first configuration example of a converter cell according to the second embodiment.

FIG. 16 is a circuit diagram showing the first configuration example of a converter cell according to the second embodiment.

Referring to FIG. 16, a converter cell 31 according to the first configuration example of the second embodiment includes: two legs 31a and 31b connected in parallel between DC nodes OPTA and OPTB; and capacitors CP and CN.

In contrast to legs 30a and 30b of converter cell 30 in FIG. 4, legs 31a and 31b do not include diodes D5a, D6a and diodes D5b, D6b, respectively, but each include two semiconductor switching elements. Specifically, in leg 31a, semiconductor switching element SWa1 is connected between nodes N1a and N2a while semiconductor switching element SWa2 is connected between nodes N2a and N3a. Also in leg 31b, semiconductor switching element SWb1 is connected between nodes N1b and N2b while semiconductor switching element SWb2 is connected between nodes N2b and N3b.

In the same manner as in converter cell 30, node N4a is connected to AC node INA, and node N4b is connected to AC node INB. Furthermore, nodes N2a and N2b are electrically connected to neutral point node Nnt of the series body capacitor. Furthermore, voltage sensors 131, 132 and current sensor 133 are disposed in the same manner as in converter cell 30 (FIG. 4).

Converter cell 31 operates as a three-level rectifier since legs 31a and 31b each output zero voltage when semiconductor switching elements SWa1, SWa2, SWb1, and SWb2 are on, in the same manner as in converter cell 30. Converter cell 31 can be disposed in place of converter cell 30 in the configuration in FIG. 1. Accordingly, converter cell 31Xn can be disposed so as to correspond to the X-phase (X=R, S, or T) and the n-th (n: a natural number of 1≤n≤k) secondary winding group.

Figure 17:
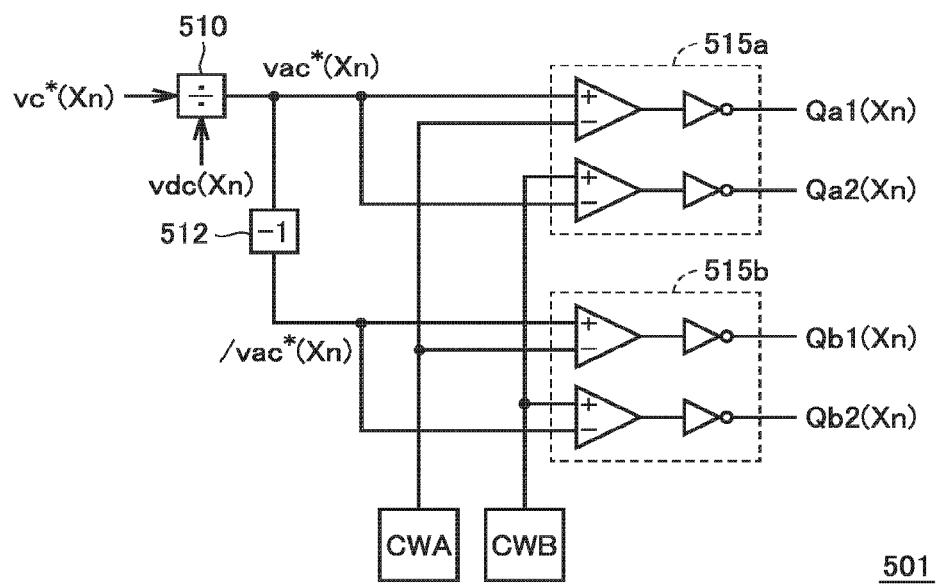
FIG. 17 is a functional block diagram illustrating a configuration example of a modulation unit corresponding to the converter cell shown in FIG. 16.

FIG. 17 is a functional block diagram illustrating the configuration of a modulation unit 501 for controlling converter cell 31. In the configuration in FIG. 5, modulation unit 501 shown in FIG. 17 is disposed in place of modulation unit 500. Thereby, drive control signals for semiconductor switching elements SWa1, SWa2, SWb1, and SWb2 in each converter cell 31 can be generated according to AC voltage command value vc*(Xn) from voltage control unit 600 described in the first embodiment.

Referring to FIG. 17, modulation unit 501 includes division unit 510, multiplication unit 512, and signal generation units 515a and 515b.

By division unit 510 and multiplication unit 512, normalized AC voltage command values vac*(Xn) and /vac*(Xn) are generated as in FIG. 12. Signal generation unit 515a generates drive control signals Qa1(Xn) and Qa2(Xn) according to the voltage comparison between AC voltage command value vac*(Xn) and each of carrier waves CWA, CWB. Similarly, signal generation unit 515b generates drive control signals Qb1(Xn) and Qb2(Xn) according to the voltage comparison between AC voltage command value /vac*(Xn) and each of carrier waves CWA, CWB.

In converter cell 31Xn, semiconductor switching elements SWa1, SWa2, SWb1, and SWb2 are controlled to be turned on and off by drive control signals Qa1(Xn), Qa2(Xn), Qb1(Xn), and Qb2(Xn), respectively. Specifically, semiconductor switching elements SWa1, SWa2, SWb1, and SWb2 are turned on when their respective drive control signals are at H levels, and turned off when their respective drive control signals are at L levels.

Signal generation unit 515a sets drive control signal Qa1(Xn) at an H level in a time period during which AC voltage command value vac*(Xn) is lower than the voltage of carrier wave CWA. In contrast, signal generation unit 515a sets drive control signal Qa1(Xn) at an L level in a time period during which AC voltage command value vac*(Xn) is higher than the voltage of carrier wave CWA. Accordingly, in the time period during which AC voltage command value vac*(Xn)<0, drive control signal Qa1(Xn) is fixed to an H level.

Furthermore, drive control signal Qa2(Xn) is set at an L level in a time period during which the voltage of carrier wave CWB is higher than AC voltage command value vac*(Xn), and set at an H level in a time period during which the voltage of carrier wave CWB is lower than AC voltage command value vac*(Xn). Accordingly, in the time period during which AC voltage command value vac*(Xn)>0, drive control signal Qa2(Xn) is fixed to an H level.

As a result, as compared with the time period during which drive control signal Qa(Xn) of semiconductor switching element SWa in converter cell 30Xn shown in FIG. 13 is at an H level, the ON period during which drive control signal Qa(Xn) is at an H level includes: a half cycle in which AC voltage command value vac*(Xn)>0, during which drive control signal Qa1(Xn) shifts to an H level; and a half cycle in which AC voltage command value vac*(Xn)<0, during which drive control signal Qa2(Xn) shifts to an H level.

In other words, the ON period of semiconductor switching element SWa in converter cell 30 (FIG. 13) is shared by semiconductor switching elements SWa1 and SWa2 in accordance with the polarity of AC voltage command value vac*(Xn).

Similarly, signal generation unit 515b sets drive control signal Qb1(Xn) at an H level in a time period during which AC voltage command value /vac*(Xn) is lower than the voltage of carrier wave CWA. In contrast, signal generation unit 515b sets drive control signal Qb1(Xn) at an L level in a time period during which AC voltage command value /vac*(Xn) is higher than the voltage of carrier wave CWA. Furthermore, drive control signal Qb2(Xn) is set at an L level in a time period during which the voltage of carrier wave CWB is higher than AC voltage command value /vac*(Xn), and set at an H level in a time period during which the voltage of carrier wave CWB is lower than AC voltage command value /vac*(Xn).

Thus, drive control signal Qb1(Xn) is set at an H level in a half cycle in which AC voltage command value /vac*(Xn)>0 in the time period during which drive control signal Qb(Xn) in converter cell 30Xn is at an H level as shown in FIG. 13. Furthermore drive control signal Qb2(Xn) is set at an H level in a half cycle in which AC voltage command value /vac*(Xn)<0 in the time period during which drive control signal Qb(Xn) is at an H level (FIG. 13).

Therefore, the ON period (FIG. 13) of semiconductor switching element SWb in converter cell 30 is also shared by semiconductor switching elements SWb1 and SWb2 in accordance with the polarity of AC voltage command value /vac*(Xn). Thus, in converter cell 31, heat generated in the semiconductor switching element can be dispersed, so that thermal design is facilitated.

Converter cell 31 also can perform power conversion between the single-phase AC voltage and the DC voltage while outputting the voltages of three levels to each of AC nodes INA and INB by turning on and off semiconductor switching elements SWa1, SWa2, SWb1, and SWb2. In other words, even when each converter cell 30 is replaced with converter cell 31 in power conversion device 10 according to the first embodiment, the effect described in the first embodiment can also be achieved.

Figure 18:
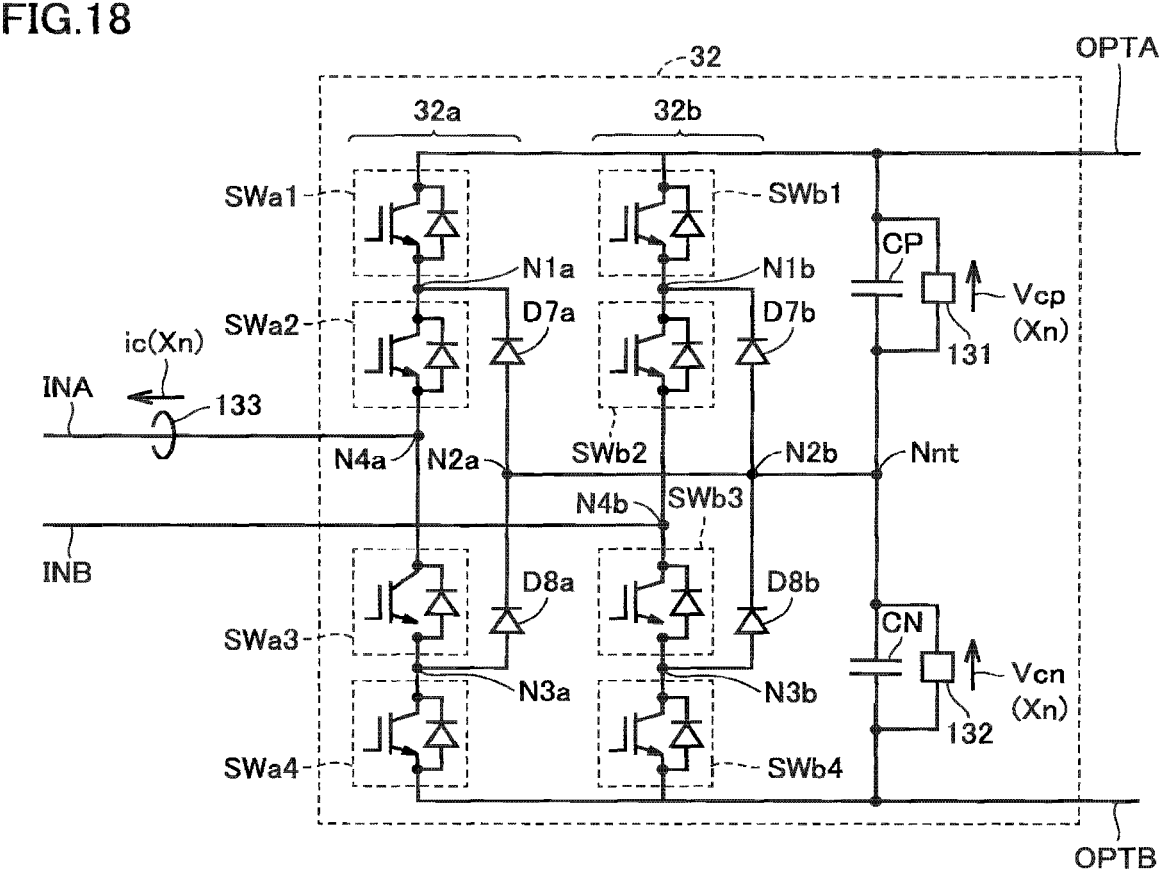
FIG. 18 is a circuit diagram showing the second configuration example of a converter cell according to the second embodiment.

FIG. 18 is a circuit diagram showing the second configuration example of a converter cell according to the second embodiment.

Referring to FIG. 18, a converter cell 32 according to the second configuration example of the second embodiment has a circuit configuration referred to as a 3-level NPC (neutral point clamped). Converter cell 32 includes: two legs 32a and 32b connected in parallel between DC nodes OPTA and OPTB, and capacitors CP and CN.

In each of legs 32a and 32b, the diodes and the semiconductor switching elements are replaced in position with each other as compared with legs 31a and 31b in converter cell 31 in FIG. 16. Specifically, in leg 32a, semiconductor switching element SWa1 is connected between DC node OPTA and node N1a while semiconductor switching element SWa2 is connected between nodes N1a and N4a. Semiconductor switching element SWa3 is connected between nodes N4a and N3a while semiconductor switching element SWa4 is connected between node N3a and DC node OPTB.

Furthermore, a diode D7a is connected between nodes N1a and N2a on the condition that the direction from node N2a to node N1a is defined as a forward direction. A diode D8a is connected between nodes N2a and N3a on the condition that the direction from node N3a to node N2a is defined as a forward direction.

Leg 32b includes semiconductor switching elements SWb1 to SWb4 and diodes D7b, D8b. Semiconductor switching elements SWb1 to SWb4 and diodes D7b, D8b are connected to DC nodes OUTA and OUTB and nodes N1b to N4b in the same manner as with semiconductor switching elements SWa1 to SWa4 and diodes D7a, D8a in leg 32a.

Converter cell 32 can be disposed in place of converter cell 30 in the configuration in FIG. 1. Thus, a converter cell 32Xn can be disposed so as to correspond to the X-phase (X=R, S, or T) and the n-th (n: a natural number of 1≤n≤k) secondary winding group.

Figure 19:
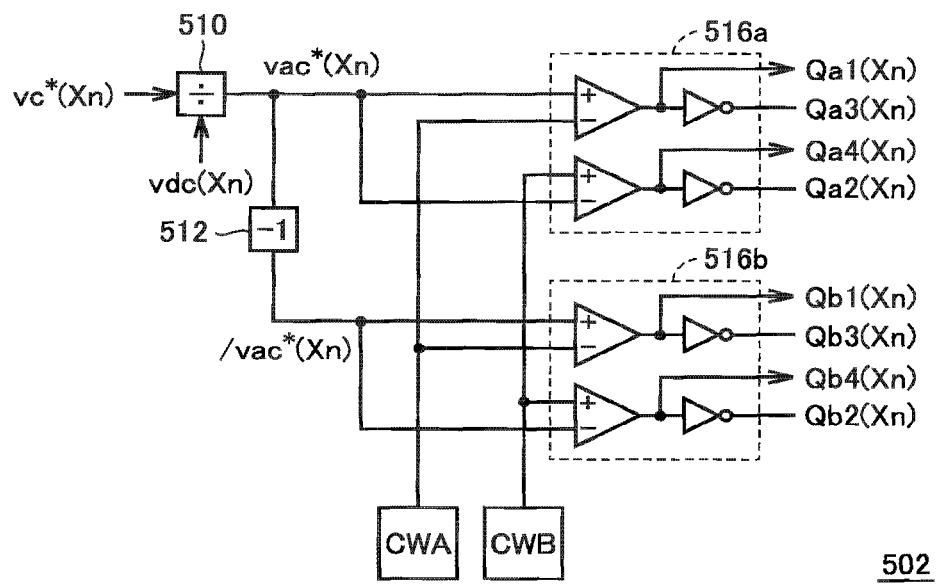
FIG. 19 is a functional block diagram illustrating a configuration example of a modulation unit corresponding to the converter cell shown in FIG. 18.

FIG. 19 is a functional block diagram illustrating the configuration of a modulation unit 502 for controlling converter cell 32. As modulation unit 502 shown in FIG. 19 is disposed in the configuration in FIG. 5 in place of modulation unit 500, the drive control signals for semiconductor switching elements SWa1 to SWa4 and SWb1 to SWb4 in each converter cell 32 can be generated according to AC voltage command value vc*(Xn) from voltage control unit 600 described in the first embodiment.

Referring to FIG. 19, modulation unit 502 includes division unit 510, multiplication unit 512, and signal generation units 516a and 516b.

By division unit 510 and multiplication unit 512, normalized AC voltage command values vac*(Xn) and /vac*(Xn) are generated as in FIG. 12. Signal generation unit 516a generates drive control signals Qa1(Xn) to Qa4(Xn) according to the voltage comparison between AC voltage command value vac*(Xn) and each of carrier waves CWA, CWB. Similarly, signal generation unit 516b generates drive control signals Qb1(Xn) to Qb4(Xn) according to the voltage comparison between AC voltage command value /vac*(Xn) and each of carrier waves CWA, CWB.

In converter cell 32Xn, semiconductor switching elements SWa1 to SWa4 and SWb1 to SWb4 are controlled to be turned on and off by drive control signals Qa1(Xn) to Qa4(Xn) and Qb1(Xn) to Qb4(Xn), respectively. Specifically, semiconductor switching elements SWa1 to SWa4 and SWb1 to SWb4 are turned on when the respective drive control signals are at H levels and turned off when the respective drive control signals are at L levels.

In the time period during which AC voltage command value vac*(Xn) is higher than the voltage of carrier wave CWA, signal generation unit 516a sets drive control signal Qa1(Xn) at an H level and sets drive control signal Qa3(Xn) at an L level. In contrast, in the time period during which AC voltage command value vac*(Xn) is lower than the voltage of carrier wave CWA, drive control signal Qa1(Xn) is set at an L level while drive control signal Qa3(Xn) is set at an H level. In other words, semiconductor switching elements SWa1 and SWa3 are complementarily turned on and off.

Furthermore, in the time period during which AC voltage command value vac*(Xn) is lower than the voltage of carrier wave CWB, signal generation unit 516a sets drive control signal Qa4(Xn) at an H level and sets drive control signal Qa2(Xn) at an L level. In contrast, in the time period during which AC voltage command value vac*(Xn) is higher than the voltage of carrier wave CWB, drive control signal Qa4(Xn) is set at an L level while drive control signal Qa2(Xn) is set at an H level. In other words, semiconductor switching elements SWa2 and SWa4 are complementarily turned on and off.

In the time period during which AC voltage command value /vac*(Xn) is higher than the voltage of carrier wave CWA, signal generation unit 516b sets drive control signal Qb1(Xn) at an H level and sets drive control signal Qb3(Xn) at an L level. In contrast, in the time period during which AC voltage command value vac*(Xn) is lower than the voltage of carrier wave CWA, drive control signal Qb1(Xn) is set at an L level while drive control signal Qb3(Xn) is set at an H level. In other words, semiconductor switching elements SWb1 and SWb3 are complementarily turned on and off.

Furthermore, in the time period during which AC voltage command value /vac*(Xn) is lower than the voltage of carrier wave CWB, signal generation unit 516b sets drive control signal Qb4(Xn) at an H level and sets drive control signal Qb2(Xn) at an L level. In contrast, in the time period during which AC voltage command value /vac*(Xn) is higher than the voltage of carrier wave CWB, drive control signal Qb4(Xn) is set at an L level while drive control signal Qb2(Xn) is set at an H level. In other words, semiconductor switching elements SWb2 and SWb4 are complementarily turned on and off.

As a result, in converter cell 32, semiconductor switching element SWa3 is turned on so as to correspond to the ON period of semiconductor switching element SWa1 in converter cell 31 while semiconductor switching element SWa4 is turned on so as to correspond to the ON period of semiconductor switching element SWa2 in converter cell 31. Thereby, in the case where AC current ic(Xn) flows in any direction, each of Vcp(Xn) or −Vcn(Xn) can be output to AC node INA. In this case, the voltage on neutral point node Nnt in the series body capacitor is set at zero.

Similarly, in converter cell 32, semiconductor switching element SWb3 is turned on so as to correspond to the ON period of semiconductor switching element SWb1 in converter cell 31 while semiconductor switching element SWb4 is turned on so as to correspond to the ON period of semiconductor switching element SWb2 in converter cell 31. Thereby, in the case where AC current ic(Xn) flows in any direction, each of Vcp(Xn) or −Vcn(Xn) can be output to AC node INB. In this case, the voltage on neutral point node Nnt in the series body capacitor is set at zero.

As a result, in the same manner as in converter cell 31, converter cell 32 also can perform power conversion between the single-phase AC voltage and the DC voltage while outputting the voltages of three levels to each of AC nodes INA and INB. Also, converter cell 32 can address power regeneration, i.e., the power flow from DC terminals 102P and 102N to three-phase AC power supply 101.

In other words, even when converter cell 32 is provided in place of each converter cell 30 in power conversion device 10 according to the first embodiment, the effect described in the first embodiment can still be achieved, and also, power regeneration, i.e., the power flow from DC terminals 102P and 102N to three-phase AC power supply 101, can be addressed.

Furthermore, in converter cell 32 having a circuit configuration of 3-level NPC, the operation of converter cell 32 is not restricted even in the case where a power factor is other than 1, or the voltage and the current are different in phase in AC nodes INA and INB. Thus, even though third harmonic current superimposition unit 650 is not disposed in the control configuration shown in FIG. 5, the harmonic of the current flowing through the primary winding of transformer 20 can be suppressed.

The first and second embodiments have been described with regard to the example in which power conversion device 10 is formed using a converter cell including legs each capable of outputting voltages of three levels. However, also in the configuration in which converter cell 30 in FIG. 1 is replaced with a converter cell including legs each capable of outputting voltages of two levels, power conversion between AC power and DC power can be performed between AC power supply 101 having multiple phases and DC terminals 102P, 102N.

However, by applying a converter cell including legs each capable of outputting voltages of three levels, the DC voltage between DC nodes OPTA and OPTB can be raised for use of the semiconductor switching elements having the same withstand voltage, as compared with the single-phase converter circuit formed of a converter cell including legs each outputting voltages of two levels. As a result, a converter cell represented by converter cells 30 to 32 and including legs each capable of outputting voltages of three levels is used to thereby allow reduction in number of series-connected converter cells that is required to generate the same full voltage (the DC voltage between DC terminals 102P and 102N). Reduction in number of converter cells is equivalent to reduction in number of secondary windings of transformer 20 connected to AC nodes INA and INB of the converter cell. Thus, transformer 20 can be further reduced in size.

Furthermore, by using a converter cell including legs each capable of outputting voltage of three levels, the harmonic of the current flowing through the secondary winding can be suppressed. Thereby, the power loss in transformer 20 resulting from the harmonic can also be suppressed. In addition, irrespective of the circuit configuration of the converter cell applied to power conversion device 10, MMC 70 may be connected to DC terminals 102P and 102N as in FIG. 15.

For the purpose of clarification, it has been initially intended at the time of filing of the present application to appropriately combine the configurations described in the above embodiments, including any combination not mentioned in the specification, within a range free of inconsistency or contradiction.

The embodiments disclosed herein are also intended to be combined as appropriate for implementation. It should be construed that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

10 power conversion device, 11R, 11S, 11T AC terminal, 20 transformer, 21 core, 30, 30R1, 30R2, 30S1, 30S2, 30T1, 30T2, 30Xn, 31, 31Xn, 32, 32Xn converter cell, 30a, 30b, 31a, 31b, 32a, 32b leg, 80 AC motor, 101 AC power supply, 102N, 102P DC terminal, 103, 104, 131, 132 voltage sensor, 133 current sensor, 400 control circuit, 410 sensor value communication unit, 420 drive circuit, 500 to 502 modulation unit, 510 division unit, 512 multiplication unit, 514a, 514b, 515a, 515b, 516a, 516b signal generation unit, 600 voltage control unit, 610 full-voltage control unit, 612, 632 to 634 average value computing unit, 613, 623, 641 deviation computing unit, 614, 635, 636, 637, 642 PI control unit, 615 noninteracting control unit, 616 coordinate conversion unit, 620 AC current control unit, 617, 618, 622 addition unit, 619, 655 coordinate inverse conversion unit, 625 proportional control unit, 626, 643 subtraction unit, 630 inter-phase voltage balancing control unit, 631 moving average computing unit, 638 AC signal generation unit, 639 signal generation unit, 640 in-cell voltage balance control unit, 650 third harmonic current superimposition unit, 651 tangent inverse function computing unit, 652, 654, 657 multiplication unit, 653 tangent function computing unit, 656 gain multiplication unit, CN, CP capacitor, CWA, CWA1, CWA2, CWB, CWB1, CWB2 carrier wave, D1a to D8a, D1b to D8b diode, INA, INB AC node (converter cell), Nnt neutral point node (series body capacitor), OPTA, OPTB DC node (converter cell), PRW primary winding group, Qa(Xn), Qa1(Xn) to Qa4(Xn), Qb(Xn), Qb1(Xn) to Qb4(Xn) drive control signal, R1A, R1B, R2A, R2B, S1A, S1B, S2B, S2A, T1A, T1B, T2A, T2B terminal (secondary winding), SWa, Sural to SWa4, SWb, SWb1 to SWb4 semiconductor switching element, SDW, SDW1, SDW2 secondary winding group, Vcn(Xn), Vcp(Xn) capacitor voltage, Vdc(Xn) DC voltage (converter cell), Vdc* voltage command value (converter cell), ic*(Xn) AC current command value, ic(Xn) AC current (converter cell), ic0*(Xn) sinusoidal current command value, ithi*(n) third harmonic current command value, sigR, sigS, sigT AC signal, vac(Xn) AC voltage, vacRS, vacST line voltage, vc*(Xn) AC voltage command value.

The invention claimed is:

1. A power conversion device that performs power conversion between a plurality of AC terminals connected to an AC power supply having multiple phases and a first DC terminal and a second DC terminal, the power conversion device comprising:
a transformer including
a plurality of primary windings connected in multiple phases to respective AC terminals, and
a plurality of secondary windings each formed of a single-phase open winding; and
a plurality of converter cells disposed to correspond to the plurality of secondary windings, wherein
the secondary windings are disposed to form a plurality of secondary winding groups each having secondary windings corresponding to respective multiple phases,
each of the converter cells converts a single-phase AC voltage between a pair of AC nodes each connected to a corresponding one of the secondary windings into a DC voltage by control of a plurality of semiconductor switching elements to be turned on and off, and outputs the DC voltage between a pair of DC nodes,
DC nodes of the converter cells are connected in series between the first DC terminal and the second DC terminal, and
the power conversion device further comprises
a control circuit that controls each of the semiconductor switching elements to be turned on and off so as to control an AC current on each of the AC nodes and the DC voltage between DC nodes in each of the converter cells, wherein
the control circuit includes
a voltage control unit that generates an AC voltage command value between the AC nodes for controlling the AC current according to an AC current command value that has an amplitude for controlling the DC voltage to be set at a voltage command value in each of the converter cells, and
a modulation unit that generates signals for controlling respective semiconductor switching elements to be turned on and off according to comparison between each of carrier waves and the AC voltage command value generated by the voltage control unit, and
the AC current command value is generated to have a phase in synchronization with a phase of an AC voltage in one phase of the multiple phases of the AC power supply, wherein the one phase corresponds to a phase of one secondary winding of the secondary windings to which a corresponding one of the converter cells is connected.

2. The power conversion device according to claim 1, wherein
the voltage control unit generates the AC current command value according to a sum of a positive-phase current command value and a negative-phase current command value,
the positive-phase current command value shows a sinusoidal current that has:
an amplitude for controlling an average value of the DC voltages of the converter cells to be set at the voltage command value; and
a phase in synchronization with the AC voltage, and the negative-phase current command value shows a sinusoidal current that has an amplitude and a phase for suppressing a difference between phases of the DC voltages of the converter cells.

3. The power conversion device according to claim 1, wherein
each of the converter cells includes a plurality of capacitors that are connected in series between DC nodes and that are equal in capacitance, and
the AC voltage command value is generated with addition of a DC bias component for equalizing voltages of the capacitors.

4. The power conversion device according to claim 1, wherein
the AC current command value is generated as an AC current obtained by superimposing a third harmonic current on a sinusoidal current.

5. The power conversion device according to claim 2, wherein
the AC current command value is generated by superimposing a third harmonic current on a sinusoidal current that is based on the sum of the positive-phase current command value and the negative-phase current command value.

6. The power conversion device according to claim 1, wherein
in the modulation unit, the carrier waves are shifted in phase from each other between the converter cells connected to the respective secondary windings in a same phase of the multiple phases.

7. The power conversion device according to claim 1, wherein
the first DC terminal and the second DC terminal are connected to a modular multilevel converter for motor driving.

8. The power conversion device according to claim 1, wherein
each of the converter cells is formed of a three-level rectifier.

9. The power conversion device according to claim 1, wherein
each of the converter cells is formed of a Vienna rectifier.

10. The power conversion device according to claim 1, wherein
each of the converter cells is formed of a neutral-point clamped three-level converter.

11. The power conversion device according to claim 2, wherein
each of the converter cells includes a plurality of capacitors that are connected in series between DC nodes and that are equal in capacitance, and
the AC voltage command value is generated with addition of a DC bias component for equalizing voltages of the capacitors.

* * * * *